(12) United States Patent
Hughes et al.

(10) Patent No.: US 7,553,439 B1
(45) Date of Patent: Jun. 30, 2009

(54) HIDDEN MOLD TRANSFER ASSEMBLY

(75) Inventors: Alan Hughes, Prospect, OH (US); Chad Wojniak, Westerville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 11/943,214

(22) Filed: Nov. 20, 2007

(51) Int. Cl.
*B29C 45/17* (2006.01)
*B29C 33/30* (2006.01)

(52) U.S. Cl. .................. 264/328.7; 425/88; 425/151; 425/186; 425/190

(58) Field of Classification Search ............. 425/88, 425/151, 186, 190; 264/39, 328.7
See application file for complete search history.

(56) References Cited

U.S. PATENT DOCUMENTS

| | | |
|---|---|---|
| 2,704,608 A | 3/1955 | Graf et al. |
| 3,379,124 A | 4/1968 | Bruder et al. |
| 3,389,652 A | 6/1968 | Bruder et al. |
| 3,787,158 A | 1/1974 | Brown et al. |
| 3,982,869 A | 9/1976 | Eggers |
| 4,439,123 A * | 3/1984 | Sano et al. .................. 425/186 |
| 4,529,371 A | 7/1985 | Nickley |
| 4,555,228 A | 11/1985 | Nishiike et al. |
| 4,737,091 A | 4/1988 | Fiorentini |
| 4,805,285 A | 2/1989 | Reyes |
| 4,952,129 A | 8/1990 | Zan |
| 5,044,913 A | 9/1991 | Ostman |
| 5,209,889 A | 5/1993 | Brown et al. |
| 5,660,782 A | 8/1997 | Davis |
| 6,032,491 A | 3/2000 | Nitschke et al. |
| 6,558,149 B1 | 5/2003 | Bodmer et al. |
| 6,699,026 B2 | 3/2004 | Maru et al. |
| 6,893,600 B2 * | 5/2005 | Hughes et al. ............. 425/190 |
| 7,001,171 B2 | 2/2006 | Starita |
| 7,134,860 B2 | 11/2006 | Pierik et al. |
| 2004/0001901 A1 | 1/2004 | Towery et al. |
| 2005/0144034 A1 | 6/2005 | Hunter |

* cited by examiner

*Primary Examiner*—James Mackey
(74) *Attorney, Agent, or Firm*—Rankin, Hill & Clark LLP; Vincent Ciamacco

(57) ABSTRACT

A mold transfer assembly is described that upon placement or construction along a region of an injection molding press, readily receives and retains mold(s) used in the press, and when not in use can be stored below the floor. The mold transfer assembly includes a mold receiving member that is positionable between an extended or raised state, at which the member is at a position, orientation, and height suitable for receiving a mold or set of molds from the press, and a retracted position at which the member is positioned under the floor. This configuration and positioning ability enables greater amounts of floor space to be used when the mold transfer assembly is not in use. Also described is a molding platen having a selectively positionable mold support ledge that enables molds of different sizes to be used in a single press.

17 Claims, 14 Drawing Sheets

HIDDEN MOLD TRANSFER ASSEMBLY

BACKGROUND OF THE INVENTION

The presently disclosed embodiments are directed to the field of manufacturing and molding, and particularly, to injection molding equipment and processes for producing relatively large parts or components.

Large, industrial presses use injection molds, tools or dies that are pressed together under high pressure in one or more operations to receive molding material to thereby form a part or component. Typically, injection molds comprise a set of molds, typically two, that when engaged together, define a hollow interior into which molding material is injected under very high pressure to form parts having a shape or configuration corresponding to the hollow interior defined by the molds.

Injection molds are typically interchangeable, so that different molds can be used in a single press. This enables manufacture of a wide array of different parts from a single press, by merely interchanging the molds in the press. In addition, molds are often replaceable so that after excessive use or if they become damaged, the molds can be replaced with new molds. Moreover, in many pressing operations, after a certain number of cycles, the mold(s) must be cleaned or otherwise serviced. Rather than incurring downtime in the operation, the mold(s) may simply be replaced with other mold(s), so that operation can continue while the previously used mold(s) are serviced.

A consequence of using multiple molds with a single press, is that the molds which are not in use, must be stored yet readily accessible for subsequent use. This is also a consequence of using multiple molds that must be periodically maintained or otherwise serviced.

U.S. Pat. No. 4,805,285 to Reyes is representative of efforts taken in the art to address operations involving the interchangeability and replacement of molds. The '285 patent is directed to a method of changing injection molds. Reyes describes a sequence of operations using an overhead crane and corresponding support tracks extending over the molding press and the region of interest in the facility. The method involves aligning and transporting the molds between the press and areas on the floor around the press at which the molds are stored or otherwise placed.

Although necessary in certain instances, storing molds on the floor is generally undesirable. First, that practice can lead to injury if someone trips or stumbles upon the molds. Second, molds must be maintained to be free of dirt or other particles. This is particularly so for molds used in producing high precision or high tolerance parts. Placing molds on the floor can lead to contamination of the molds. Third, molds frequently contain coatings or residual amounts of liquids such as oils, water, and various chemical agents used in the molding process. Storing such molds on the floor can promote collection of these liquids and agent(s) on the floor and into the work environment, which may create safety hazards and violate local safety codes. Fourth, storing molds on the floor uses valuable floor space. This may be particularly undesirable in many industrial and manufacturing facilities.

Another reason for not simply placing unused molds on the floor, pertains to desirability in tracking and identifying the location of all molds associated with a particular press, or perhaps those used in a facility or region of a facility. In highly automated manufacturing processes using one or more presses, the various molds associated with the press(es) are stored and their location tracked by electronic control systems such that prior to a mold change operation, the location and the state of the successor mold is known by the system. This increases overall efficiency of the process as downtime resulting from searching for the desired mold is avoided. Artisans have further developed strategies for reducing downtime otherwise resulting from mold changing operations. These strategies are typically referred to as "Quick Mold Change" (QMC) or "Quick Die Change" (QDC) techniques.

In view of these and other factors, mold carts have been developed and are typically used in conjunction with presses to transport molds away from the floor regions around the press and more recently, to facilitate storage and stocking of molds. Mold carts can be used to transport one or more molds between presses and various regions in the manufacturing facility. Mold carts can also serve to store one or more molds, such as by receiving and supporting the mold and then transporting the mold(s) to a designated storage region in the facility. Mold carts may also be equipped with a mold receiving surface having a selectively adjustable position and orientation. This enables the receiving surface to be positioned alongside the press to readily receive the mold from the press or place a new or successor mold in a proper position for placement in the press.

In view of the foregoing, many different types of mold carts are commercially available. Mold carts are available with remote controls for "driving" the cart and controlling its operations. Mold carts that can be interfaced with automated processes are also known.

As process operations have grown in complexity and increased in efficiency, mold carts have also been used to support just-in-time and/or just-in-sequence manufacturing strategies. And so, a new generation of automatic carts has been developed which can be interfaced with a plant-wide control system to selectively store, transport, pre-stage, and post-stage molds at desired locations and times in a manufacturing system.

Although mold carts provide numerous features and benefits, they are not always used. The cost of such carts may be prohibitive for some businesses. The layout or physical configuration of certain operations may also be a barrier to their use. Moreover, for relatively large molds, such as those used to produce large parts or components, the significant size and mass of the molds typically precludes the use of mold carts.

In response to applications in which mold carts are not used, artisans have devised assemblies and strategies directed to achieving one or more of the previously noted benefits that mold carts typically satisfy. One such strategy is to incorporate storage regions directly in or on the press. An example of such a press is described in U.S. Pat. No. 6,699,026 to Maru et al. Maru et al. describe an injection molding apparatus having a tiered frame. The tiered frame is provided with upper and lower storage sections which are said to retain one or more "injection molding machine units." Although satisfactory for small-scale applications, the tiered frame is insufficient for supporting the massive molds typically used in injection molding large parts or components.

U.S. Pat. No. 7,134,860 to Pierik et al. describes a stationary mold access and storage structure that is positioned over a press or other machine. The structure provides an elevated mold receiving surface with designated regions for mold placement and storage. Although providing a space-saving function, it is doubtful that the structure could support massive and heavy molds typically used in injection molding of large parts.

In addition, neither of the structures described in the '026 patent to Maru et al. nor the '860 patent to Pierik et al. provide any means for moving the molds from the press to a location remote from the press, and vice versa. And so, neither of the structures described in the noted patents provide any solution or assistance in changing or replacing the molds.

Assemblies are known which serve to change molds, or assist in such operations. U.S. Pat. No. 4,529,371 to Nickley describes a mold changer for an injection molding machine. The machine uses mold carriages that can be horizontally positioned alongside the molding machine. The carriages can receive and support a mold as it is removed from or transferred to the machine. In addition, U.S. Pat. No. 6,032,491 to Nitschke et al. describes an assembly for mold changing in a heated glass sheet forming station. The assembly uses a rail mounted unloading cart that transports the heated molds between various stations.

Although the '371 patent to Nickley and the '491 patent to Nitschke et al. provide similar mechanisms and strategies for mold changing, each approach still requires an assembly that consumes significant amounts of floor space around the press. Furthermore, it is questionable whether such mechanisms could be used in conjunction with massive molds employed in the production of large injection molded parts.

Although satisfactory in many respects, a need remains for an assembly and strategy for receiving, moving, and supporting one or more molds, and for the assembly when not in use, to not consume valuable floor space around the press.

SUMMARY OF THE INVENTION

It is an object of the present invention to provide an assembly and strategy for receiving, moving, and supporting one or more molds to or from an injection molding press during a mold changing operation, and which prior to or after such operation, the assembly can be positioned such that it does not consume floor space.

In a first aspect, the present invention provides a mold transfer assembly adapted for use with an injection molding press that utilizes a replaceable mold set. The mold set is accessible along a region of the press at an access opening defined at least partially above the floor. The mold transfer assembly comprises a stationary support base disposed adjacent to the injection molding press, and a mold receiving member movably engaged with the base and selectively positionable between (i) an extended position at which the mold receiving member is proximate the access opening of the press, and (ii) a retracted position at which the mold receiving member is disposed below the floor.

It is another object of the present invention to provide a combination of an injection molding press and an assembly and strategy for receiving, moving, and supporting one or more molds from the injection molding press during a mold changing operation, and which prior to or after such operation, the assembly can be positioned such that it does not consume floor space around the press.

Accordingly, in another aspect, the present invention provides an injection molding press and mold transfer assembly comprising an injection molding press that includes two platens and a replaceable mold set disposed between the platens. The mold set is accessible along a lateral region of the press. The injection molding press and mold transfer assembly also comprise a mold transfer assembly including a stationary support base disposed adjacent to the injection molding press and a mold receiving member movably engaged with the stationary support base and selectively positionable between (i) an extended position at which the mold receiving member is proximate the lateral region of the press, and (ii) a retracted position at which the mold receiving member is disposed below the floor.

Another object to which the present invention is directed, is for a strategy by which a mold or mold set can be transported between an injection molding press and a location remote from the press, without the transporting assembly permanently occupying or consuming valuable floor space around the press.

Therefore, in another aspect according to the present invention, a method is provided for transporting a mold between an interior region of an injection molding press and a location external to the injection molding press while not permanently occupying floor space around the press. The injection molding press defines an access opening at least partially above the floor at which the mold is accessible. The method comprises providing a mold transfer assembly alongside the injection molding press and within a recessed region at least partially below the floor and proximate the access opening. The mold transfer assembly includes a mold receiving member selectively positionable between (i) an extended position at which the mold receiving member is proximate the access opening of the press, and (ii) a retracted position at which the mold receiving member is disposed below the floor. The method further comprises upwardly extending the mold receiving member above the floor at which the mold receiving member is proximate the access opening of the press and at a location external to the press. The method additionally comprises transferring the mold from the interior of the press to the mold receiving member. And, the method then comprises retracting the mold receiving member below the floor within the recessed region.

The difficulties and drawbacks associated with previous-type systems are overcome in the present method and apparatus for a hidden mold transfer assembly, and a combined injection molding press and hidden mold transfer assembly.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

As described herein, the present invention provides a hidden mold transfer assembly that is preferably at least partially disposed within a recessed pit or region alongside an injection molding press. The preferred embodiment mold transfer assembly is positionable between two states, a retracted or stowed state in which the assembly is disposed entirely below floor level, and an extended state in which the assembly is in a raised position and able to receive a mold set or other mold components from the interior of the press. Numerous other features and variations of the present invention assembly and related methods are described herein.

The injection molding presses with which the present invention hidden mold transfer assembly can be used, are generally of the larger, hydraulic or hybrid, i.e. electric and hydraulic, type. Hydraulic presses in the range of from 200 tons to 6,000 tons, or more, are typically those with which the preferred embodiment mold transfer assemblies are used. However, the present invention includes applications involving smaller tonnage presses and/or in conjunction with all electric presses. The present description however is made with regard to a representative 4400 ton injection molding machine with quick mold change equipment as known in the art.

Figure 1:
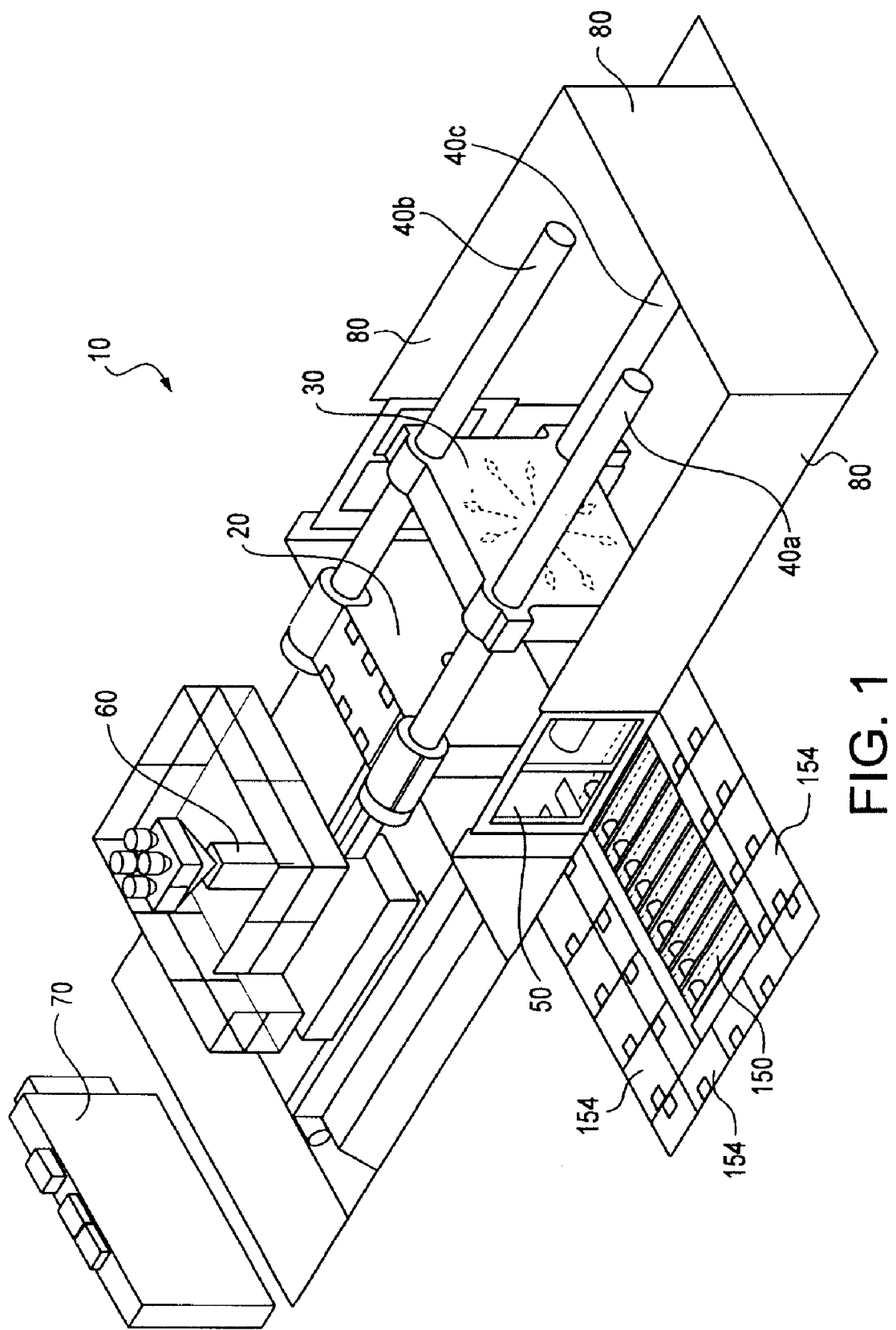
FIG. 1 is a perspective view of a preferred embodiment hidden mold transfer assembly shown in a retracted position in conjunction with an injection molding press, in accordance with the present invention.

FIG. 1 is a perspective view of a preferred embodiment hidden mold transfer assembly 150 shown in a retracted position in conjunction with a press 10, in accordance with the present invention. The press 10 generally comprises two platens that serve to apply pressure to a set of molds, described in greater detail herein. A first stationary platen 20 and a second movable platen 30 are horizontally aligned with each other and maintained in such alignment by a plurality of tie bars or guide members 40. Specifically, the guide members may include a pair of upper guide members 40a and 40b, and a corresponding pair of lower guide members 40c and 40d (not shown). The press 10 may also comprise an enclosure 80 generally surrounding the various mechanisms and assemblies of the press. One or more mold access doors 50 are preferably provided along a region of the enclosure 80 for providing lateral access to the set of molds generally positioned within the press and between the platens 20 and 30. The press also includes a material feed 60 and a material injection unit 62 (not shown in FIG. 1) for administering material to the molds for subsequent molding. One or more control panels 70 are typically disposed near the press, or in certain applications, on or adjacent to the enclosure 80. It will be appreciated that the press 10, with which the preferred embodiment hidden mold transfer assembly 150 is used, can be in a variety of different configurations. In no way is the present invention limited to the preferred embodiment hidden mold transfer assembly 150 being used with only press(es) of the type and configuration shown in the referenced figures.

Referring further to FIG. 1, the preferred embodiment hidden mold transfer assembly 150 resides within a recessed region alongside the press 10, and immediately adjacent to the mold access doors 50. Preferably, one or more access panels 154 are provided around the periphery of the mold transfer assembly 150. The panels 154 are preferably coplanar with the floor. As will be appreciated, the panels provide ease of access to the recessed regions alongside the assembly 150 generally residing below floor level. Most preferably, access panels are provided around all three exposed sides of the assembly 150. However, the present invention includes configurations in which access panels are only located along two sides or one side of the assembly 150, or not used at all.

Figure 2:
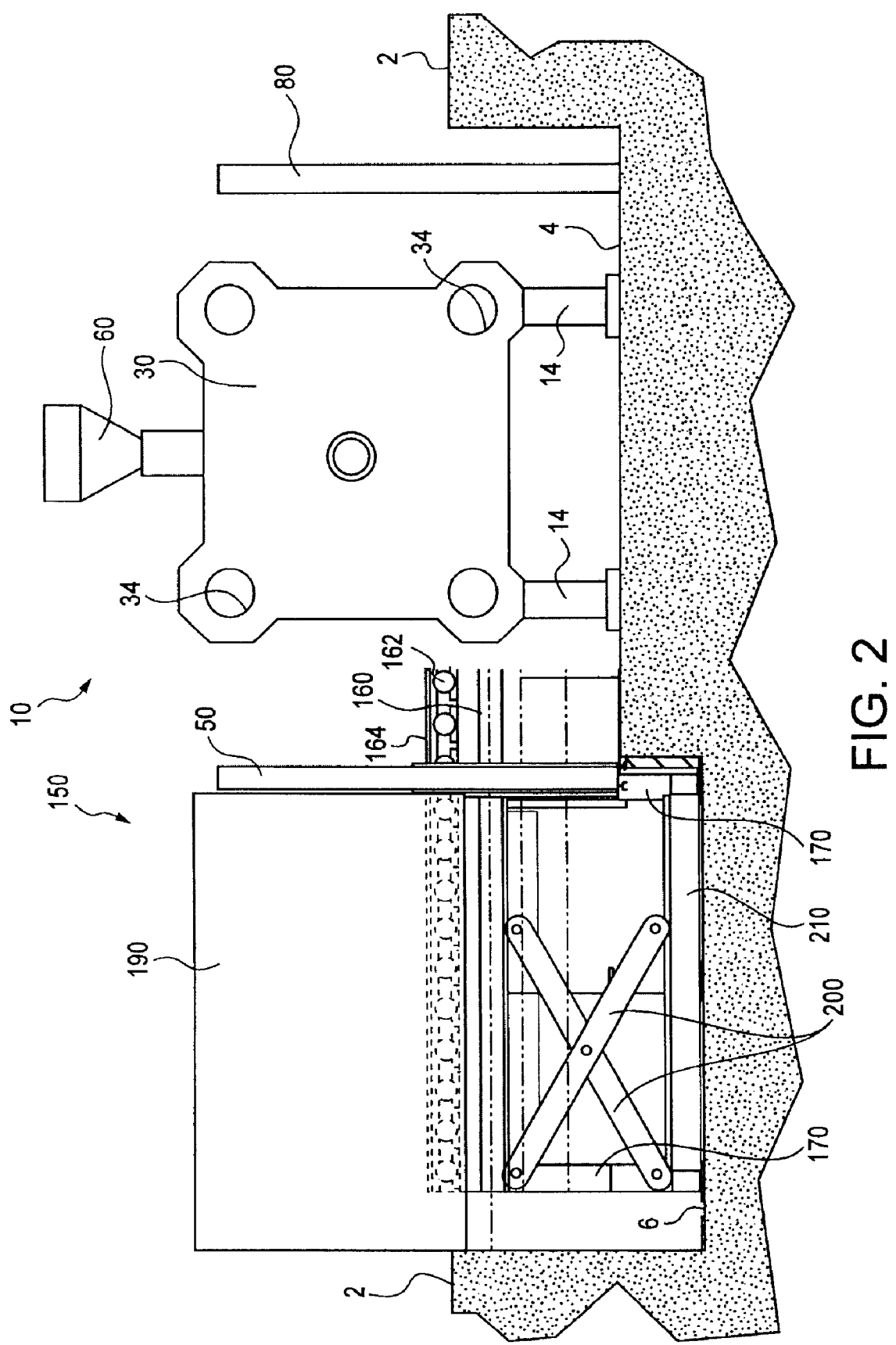
FIG. 2 is an end view of the preferred embodiment hidden mold transfer assembly shown in an elevated position, and the press of FIG. 1.

FIG. 2 is an end view of the preferred embodiment hidden mold transfer assembly 150 shown in an elevated position, alongside the press 10 of FIG. 1. The preferred embodiment hidden mold transfer assembly 150 preferably also includes a pair of doors 180 (not shown in FIG. 2) and 190 which open prior to, or upon extension or raising of the mold transfer assembly 150. The doors are preferably pivotally affixed to the floor along the recessed region within which the mold transfer assembly 150 resides. Upon opening, the doors 180 and 190 are preferably in an upright, vertical position alongside opposite regions of the assembly 150, thereby also serving to guard against individuals too closely approaching the assembly 150. Upon closing, the doors 180 and 190 are generally horizontal and co-planar with the floor. For ease in illustrating aspects of the preferred embodiment mold transfer assembly, the doors 180 and 190 are not shown in FIG. 1.

The preferred embodiment hidden mold transfer assembly 150 comprises a stationary support base disposed adjacent to the injection molding press and preferably, within the noted preferred recessed pit or region, a mold receiving member 160 generally movably engaged with the stationary support base, and an extension assembly, such an scissor-type lifting assembly 200, disposed under and in engagement with the member 160. Generally, the extension assembly extends between the support base and the mold receiving member 150. The stationary support base can be in a variety of different forms and configurations, but as depicted in FIG. 2 includes one or more horizontally extending base members 210 and a plurality of load bearing vertical support members 170.

The generally horizontal mold receiving member 160 includes a collection of rollers 162 which serve to support and enable horizontal movement of a mold or other component placed thereon. The end view of FIG. 2 further illustrates the movable platen 30 and a set of support members 14 for generally supporting the press 10 and its components. The moveable platen 30 defines a set of guide apertures 34 for receiving the previously noted guide members 40.

The preferred embodiment mold transfer assembly 150, can include a wide variety of lifting mechanisms in addition to, or instead of the scissor-type lifting assembly 200. For example, the lifting mechanism may employ vertically operated hydraulic rams, screw assemblies, and other mechanisms known in the art. Examples of representative scissor mechanisms include, but are not limited to, those described and illustrated in U.S. Pat. Nos. 4,221,280; 4,025,053; 5,394,959; 5,632,209; 6,679,479; and 7,213,686.

FIG. 2 also reveals a preferred configuration for the preferred embodiment mold transfer assembly 150. Preferably, the mold transfer assembly 150 is positioned alongside the press 10 so that upon extension or raising of the assembly 150, and specifically, the mold receiving member 160, an upper surface 164 of the member 160 is at a height such that the member 160 can readily receive the molds or mold set (not shown in FIG. 2) from the press. The molds or mold set is typically horizontally transferred from a position within the interior of the press between the platens 20 and 30. This preferred height relative to the press, generally dictates that the lifting assembly 200 of the mold transfer assembly 150 be disposed underneath the mold receiving member 160. Accordingly, it is generally preferred that the base of the mold transfer assembly 150 be positioned at a lower elevation than the base of the press 10.

In the event that the press 10 is mounted in a recessed region relative to the floor 2, such as recessed region 4 depicted in FIG. 2, then for the previously noted reasons, it is preferred that the preferred embodiment mold transfer assembly 150 be mounted in a further recessed region, such as recessed region 6 depicted in FIG. 2. Both recessed regions 4 and 6 are defined at elevations below the floor 2 of the molding or manufacturing facility. And, preferably, recessed region 6 is defined at an elevation that is below the recessed region 4. Accordingly, the term "floor" as used herein refers to a generally horizontal region generally around the press 10 and within the molding or manufacturing facility of interest, upon which workers and personnel routinely walk or otherwise perform their duties. The term "floor" as used herein does not include the horizontal recessed regions such as 4 and 6 upon which the press 10 and mold transfer assembly 150, respectively, are disposed upon. In addition, as will be appreciated, it is undesirable to ordinarily allow workers and others access to the recessed regions 4 and 6.

Figure 3:
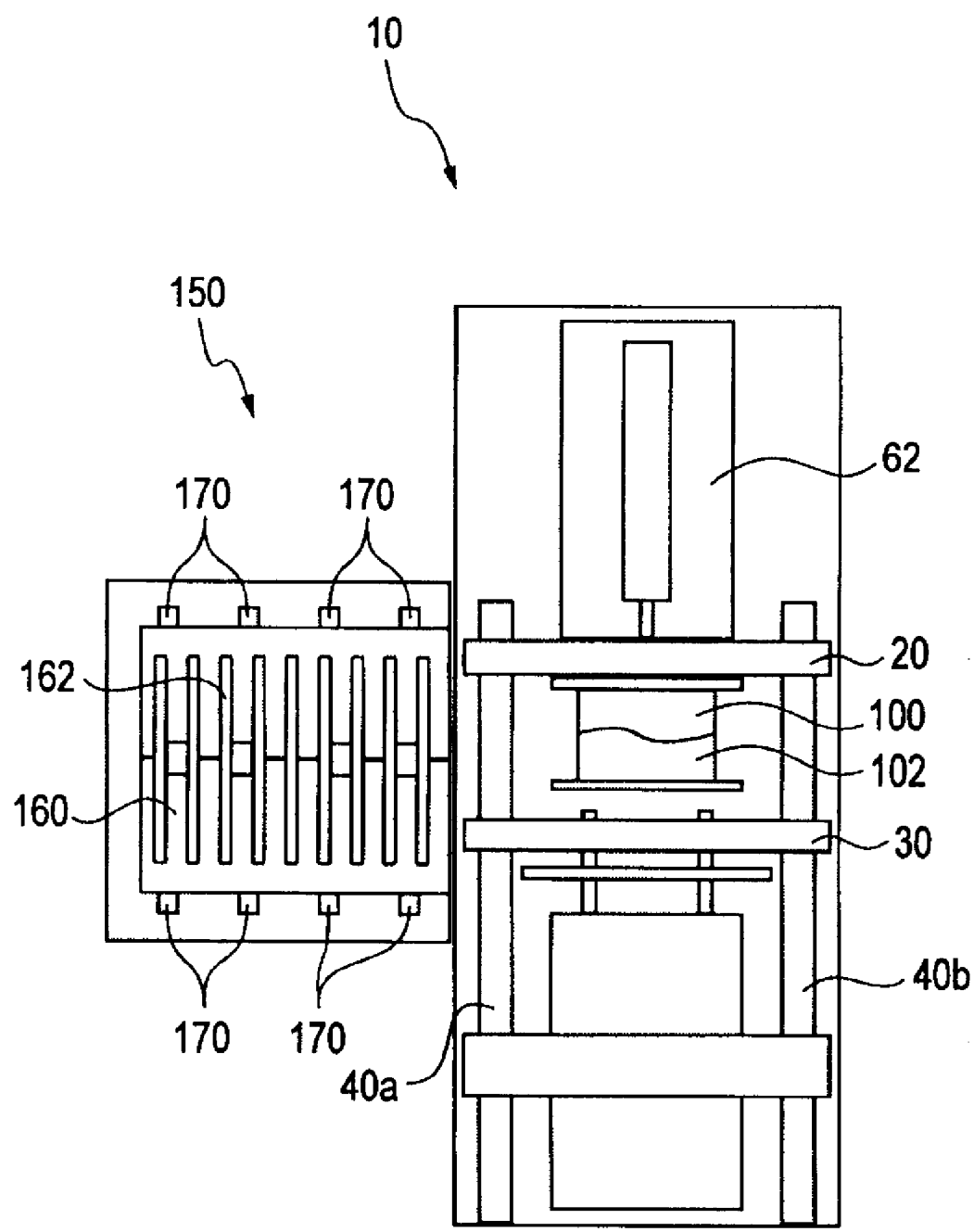
FIG. 3 is a planar schematic view of the preferred embodiment hidden mold transfer assembly and press of FIG. 1.

FIG. 3 is a planar schematic view of the preferred embodiment hidden mold transfer assembly 150 and press 10 of FIG. 1. FIG. 3 illustrates in schematic fashion, the preferred embodiment mold transfer assembly 150, without the noted doors 180 and 190. The mold transfer assembly comprises the previously noted plurality of supports 170, which are generally in the form of vertical support load bearing members. Although the preferred embodiment mold transfer assembly 150 is shown in FIG. 3 as comprising a collection of cylindrical rollers 162 that are arranged in a parallel configuration, it will be appreciated that the present invention includes other arrangements and other types of load bearing rollers, such as stationary, rotatable ball rollers. Referring to the press 10 in FIG. 3, a mold set comprising a first mold portion 100 and a second mold portion 102 are shown, positioned within the interior of the press and between the first and second platens 20 and 30. As previously noted, the second platen 30 is movable along the guide members 40a and 40b, and during a pressing operation, serves to apply a compressive force upon the mold portions 100 and 102 as they are pushed and maintained against the stationary platen 20. Flowable or molten molding material is administered to the molds by a material injection unit 62. An injection barrel (not shown) directs the molding material.

Figure 4:
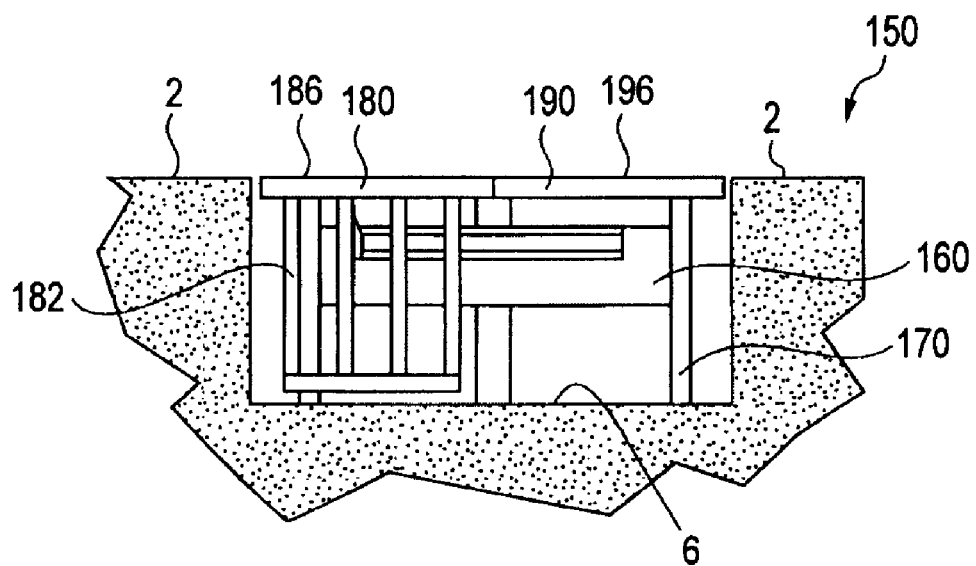
FIG. 4 is an end schematic view of the preferred embodiment hidden mold transfer assembly in a retracted position.
Figure 5:
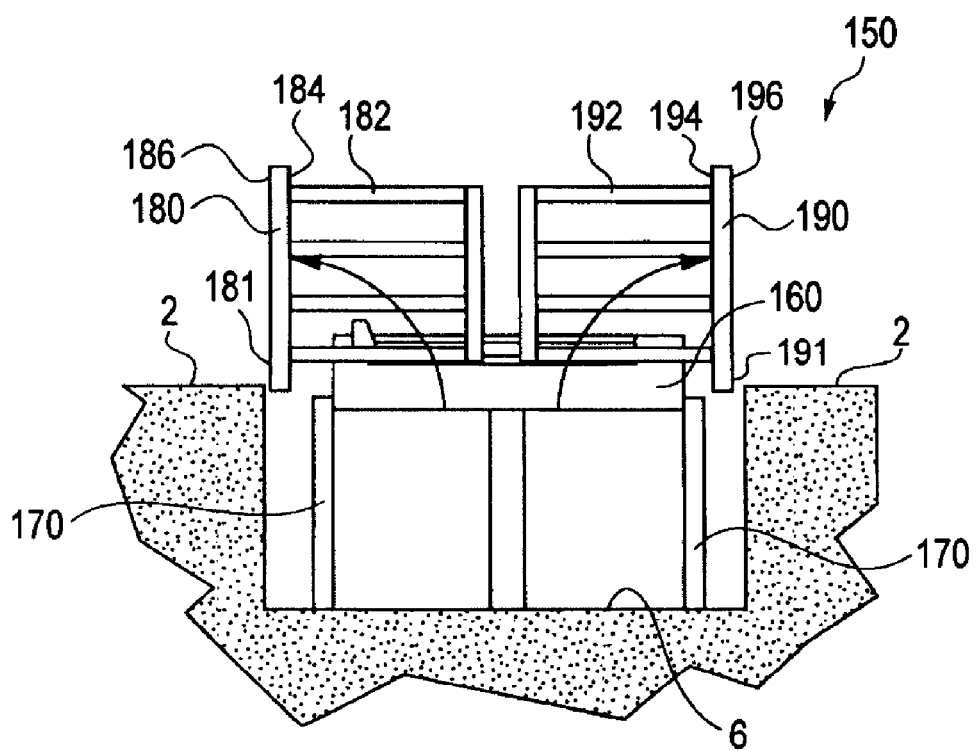
FIG. 5 is an end schematic view of the preferred embodiment hidden mold transfer assembly in an elevated position.

FIGS. 4 and 5 are end schematic views of the preferred embodiment hidden mold transfer assembly in a retracted position and an extended position, respectively. Referring to FIG. 4, the assembly 150 is shown in a retracted position, with the doors 180 and 190 in a closed horizontal position. Preferably, when the assembly 150 is in a retracted position, the assembly 150 is completely below the surrounding floor 2, and the outer faces 186 and 196 of the doors 180 and 190, respectively, are positioned at an elevation identical or substantially so, as the floor 2. Preferably affixed to or otherwise formed along the underside of the doors 180 and 190 are rails 182 and 192, respectively. That is, preferably affixed to or formed along an underside 184 of the door 180, is a first rail 182. And, preferably affixed to or formed along an underside 194 of the door 190, is a second rail 192. This arrangement, although optional in accordance with the present invention is preferable for safety reasons since upon upwardly extending the mold transfer assembly 150, the doors 180 and 190 open, and thereby position the rails 182 and 192 into an upright position serving to guard against individuals too closely approaching the assembly 150. FIG. 5 also illustrates a preferred configuration for the doors 180 and 190. Each door is preferably pivotally secured along a generally horizontal axis such as along a side or region of the door such as regions 181 and 191. The doors may be affixed to the floor 2 or to portions of the stationary support base of the mold transfer assembly 150. The means of affixment is such that each door is movable or otherwise positionable, such as pivotally movable about the point of attachment. Hinge assemblies or other pivoting and swing mechanisms may be employed for such affixment. And, it is preferred that the doors 180 and 190 are each pivotally secured along a generally horizontal axis along opposite sides or regions of the recessed region within which the mold transfer assembly 150 generally resides. The doors 180 and 190 are preferably opened and closed by one or more hydraulic pistons or actuators. Electric actuators or other mechanical assemblies may also be used.

Figure 6:
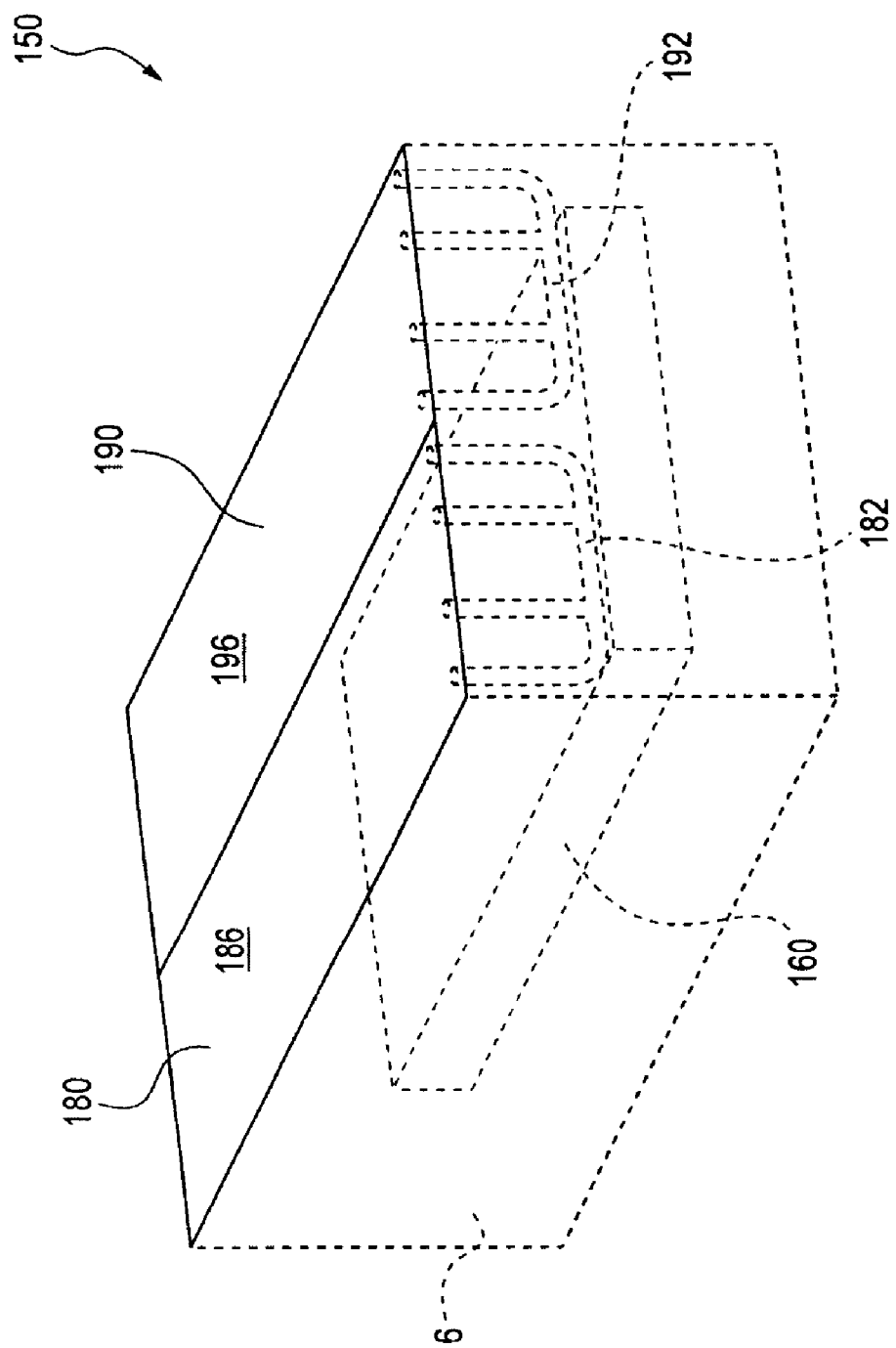
FIG. 6 is a perspective schematic view of the preferred embodiment hidden mold transfer assembly in a retracted position.
Figure 7:
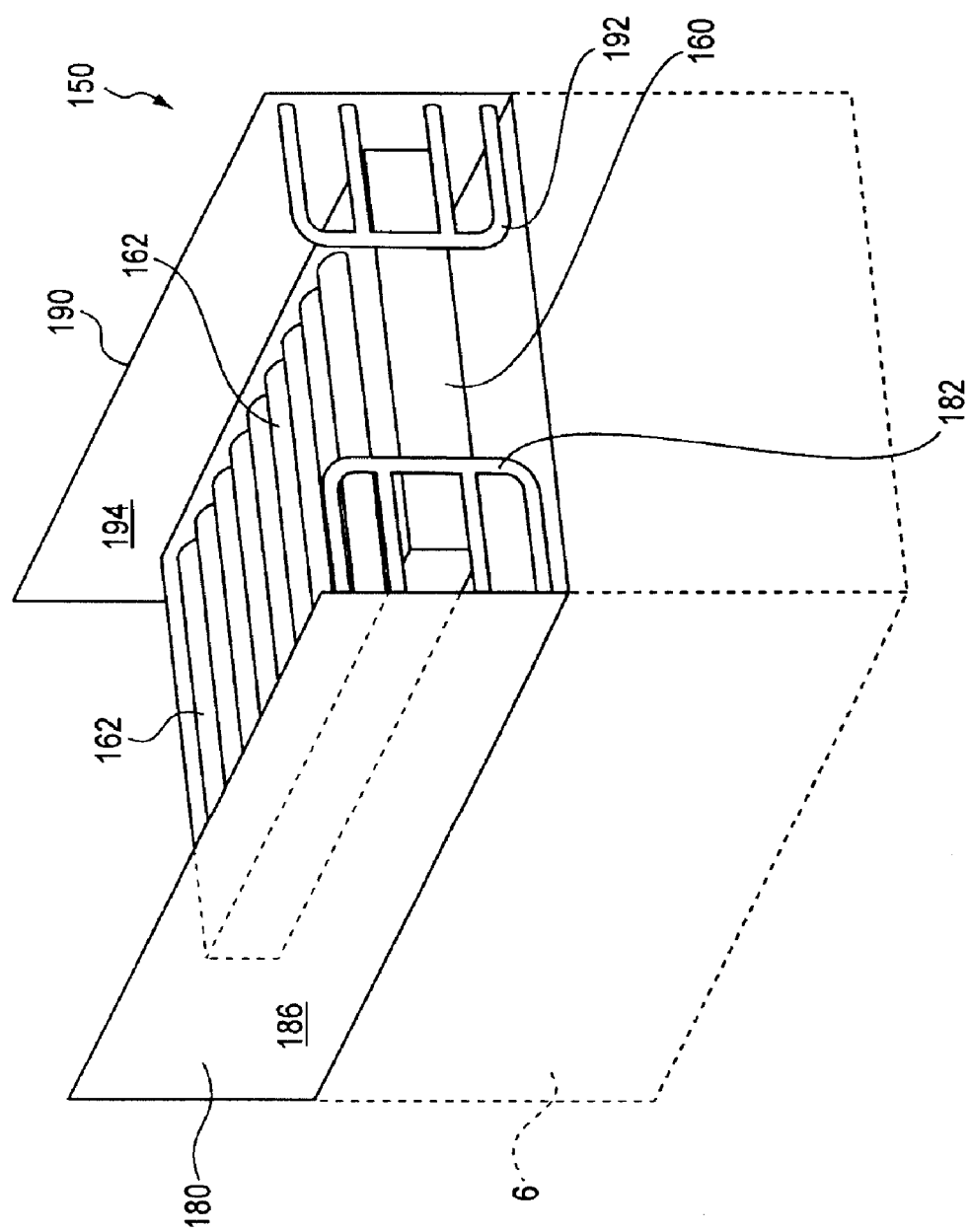
FIG. 7 is a perspective schematic view of the preferred embodiment hidden mold transfer assembly in an elevated position.

FIGS. 6 and 7 further illustrate the preferred embodiment mold transfer assembly 150 and corresponding doors 180 and 190, in a retracted and an extended state, respectively. FIG. 6 schematically depicts the assembly 150 in a retracted state, in which the doors 180 and 190 are closed and their outer faces 186 and 196 are directed vertically upward. FIG. 6 also reveals the position of the rails 182 and 192 being directed vertically downward. While in this retracted state, the mold receiving member 160 is positioned below the doors 180 and 190, while the doors are in a closed state. FIG. 7 schematically depicts the assembly 150 in an extended state, in which the doors 180 and 190 are open and in a vertical position. In this position, the outer door faces 186 and 196 (not shown) are oppositely directed from each other, and face laterally outward. The inner door faces 184 (not shown) and 194 are directed toward each other, and face laterally inward. While in this extended state, the mold receiving member 160 and corresponding rollers 162 are raised to a position generally between the doors 180 and 190. It will be appreciated that the present invention includes other configurations for door opening and closing, and other door types. For example, instead of the previously described configuration using two doors 180 and 190, a single door could be used. Alternatively, three or more doors could be utilized.

Figure 8:
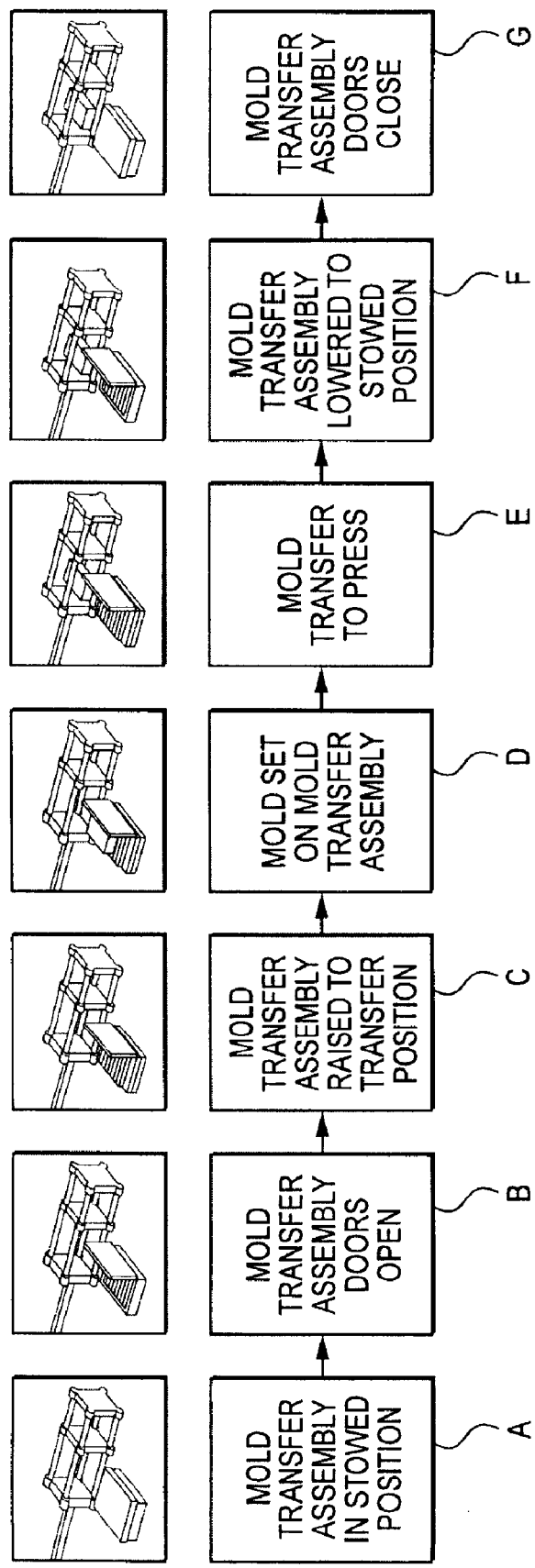
FIG. 8 is a flowchart outlining a preferred embodiment method of using the preferred embodiment hidden mold transfer assembly.

FIG. 8 is a flowchart outlining a preferred embodiment method of using the preferred embodiment hidden mold transfer assembly 150. Referring to FIG. 8, at step A, the mold transfer assembly is shown in a retracted or stowed position alongside a press. Upon initiating a mold transfer operation, beginning at step B, the mold transfer assembly doors, such as doors 180 and 190, are opened. Upon confirmation that the doors have been fully opened, the mold receiving member such as member 160 is raised to a transfer position shown in step C. The transfer position is a position at which the receiving surface of the receiving member is at a height suitable for accepting a mold from the interior of a press. In step D, the mold is transferred from the press to the receiving member. At this juncture, the mold now residing on the receiving member can be serviced or otherwise removed and transferred elsewhere. After servicing or replacement with a different mold for subsequent use in the press, step E is performed in which the mold (or replacement mold) is transferred to the interior of the press. After placement within the press, thereby removing the mold from the receiving member, the mold transfer assembly is lowered or otherwise retracted to the stowed position below the floor, as shown in step F. The transfer assembly doors are then closed as shown in step G.

Although FIG. 8 schematically depicts a single door, it will be appreciated that the present invention preferably utilizes two doors. The opening and closing of the two doors may be simultaneous such that both doors are concurrently opened, and/or such that both doors are concurrently closed. The opening and closing of the two doors may also be sequential such that a first door is fully opened before opening of the second door begins. Similarly, for closing, the doors may be operated so that one door must be fully closed prior to closing the other door.

FIGS. 9-12 illustrate in greater detail, another preferred embodiment hidden mold transfer assembly 450 and a press 310. In this embodiment, in view of the significant increase in usable floor area around the press 310 by use of the present invention, a designated mold servicing or drop cell region A is defined around one or more regions alongside the press. Within or near this region A, a service assembly is provided, that includes one or more overhead beams 550 extending between a first end region 556 generally disposed over the press 310, and a second end region 554 generally disposed over a distal region of the mold servicing region A. The one or more beams 550 are supported by one or more vertical support members 552. One or more selectively programmable robots 600 having tools or engagement members 610, may be movably engaged with the beam 550 and selectively positionable over certain regions within the mold servicing region A and the press 310. The beams 550 may also include one or more overhead cranes (not shown) as known in the art. An enclosure 700 is preferably provided around the mold servicing region A, and serves to guard against unauthorized personnel from entering the servicing region A and entrance to the press 310. While the mold transfer assembly 450 is in a stowed position, other equipment can be positioned within the mold servicing region A and directly above the mold transfer assembly 450, such as for example, conveyor 800 shown in FIG. 9.

Figure 9:
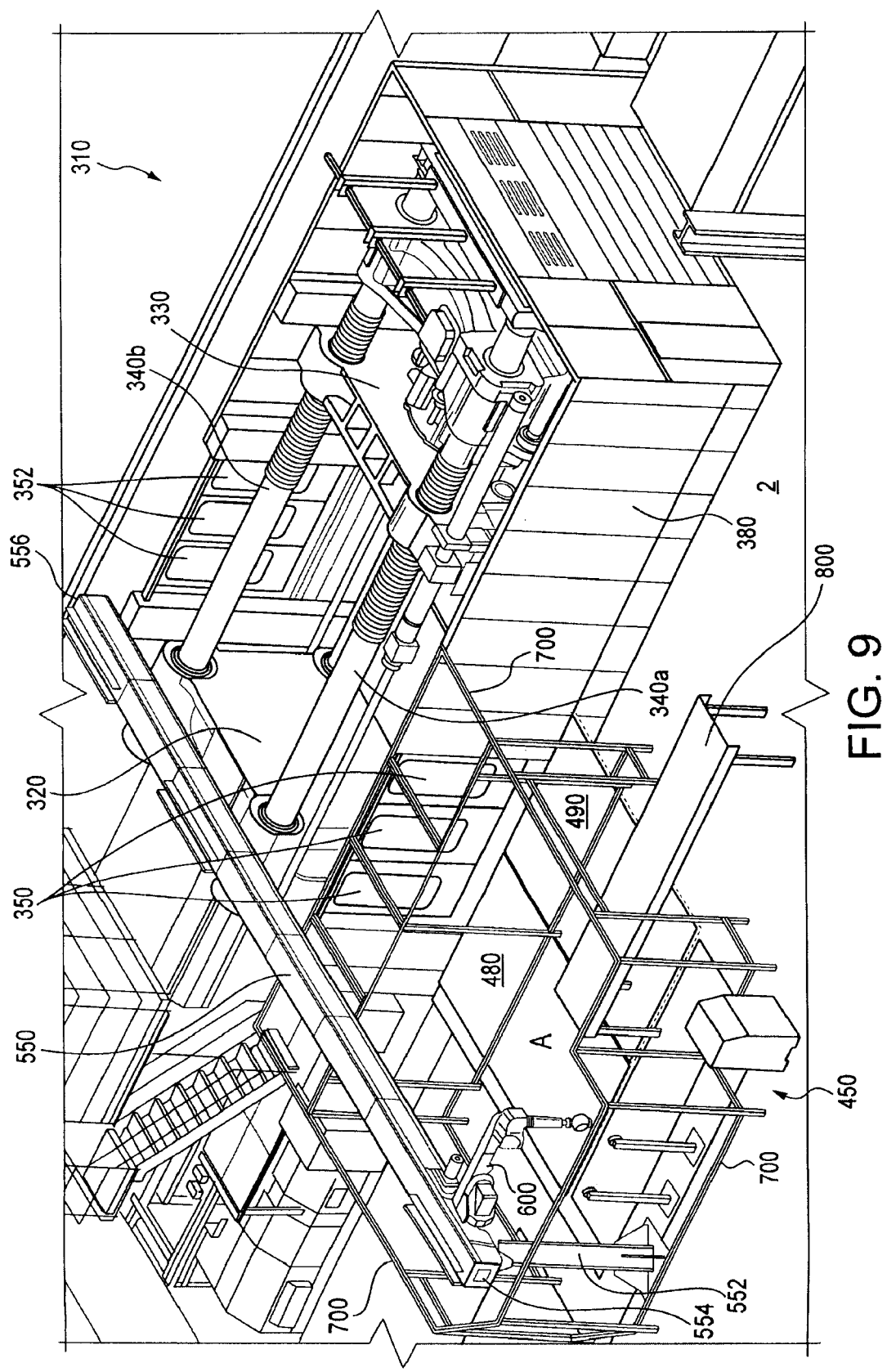
FIG. 9 is a partial sectional view of another preferred embodiment press and hidden mold transfer assembly.
Figure 10:
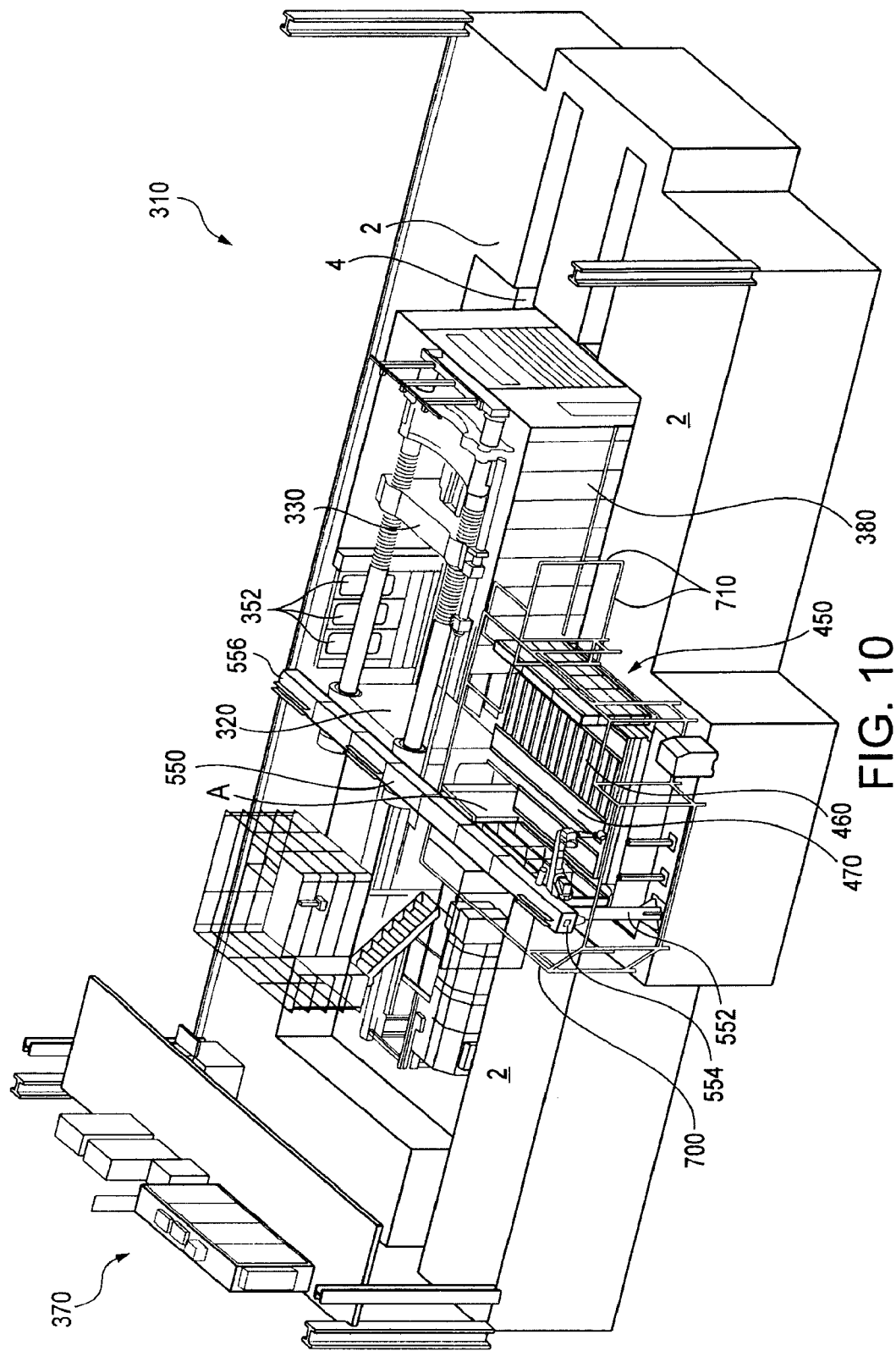
FIG. 10 is another partial sectional view of the preferred embodiment press and hidden mold transfer assembly shown in FIG. 9.
Figure 11:
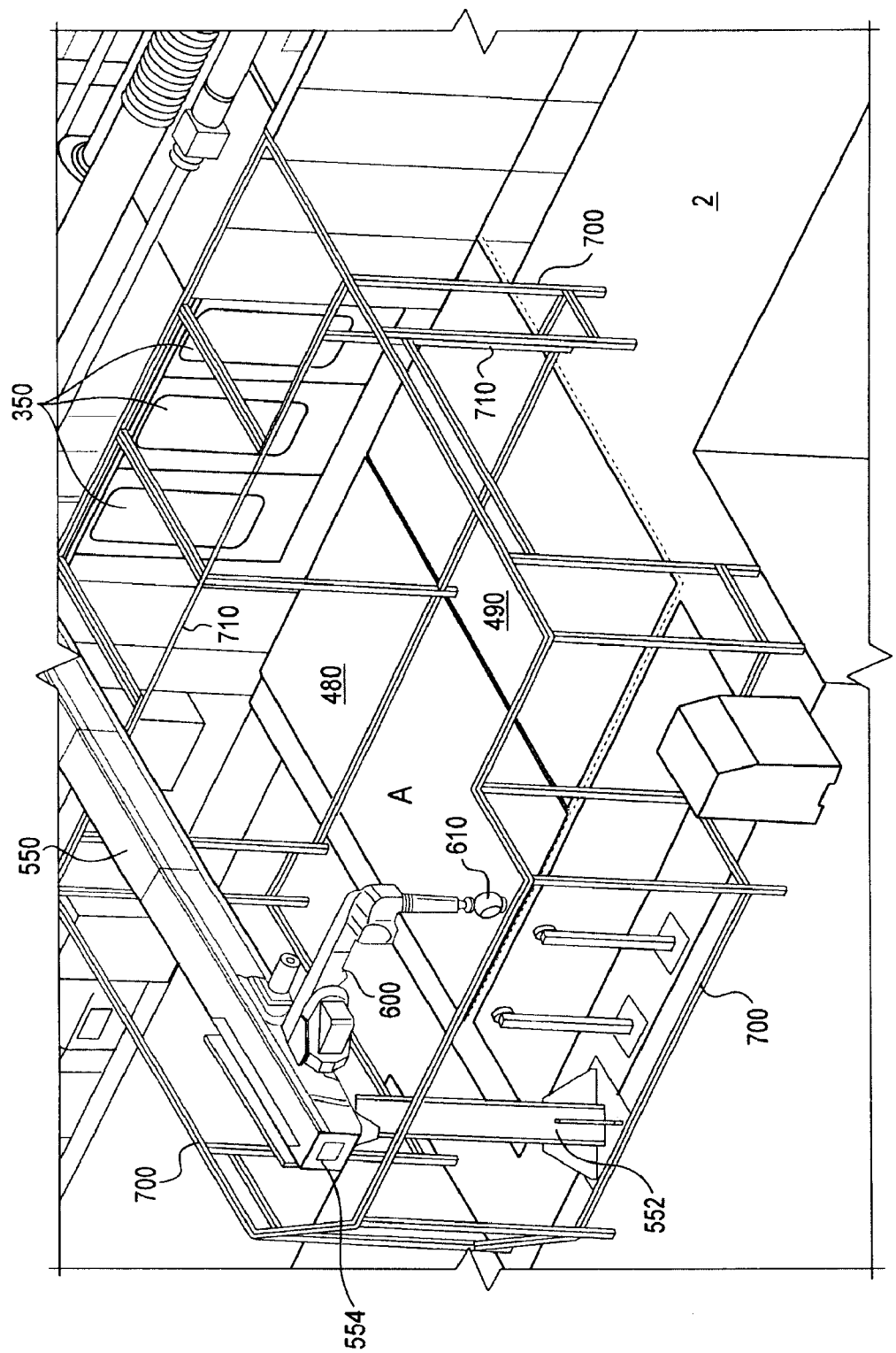
FIG. 11 is a detailed partial sectional view of the preferred embodiment press and hidden mold transfer assembly shown in FIGS. 9 and 10, in which the mold transfer assembly is in a stowed position.
Figure 12:
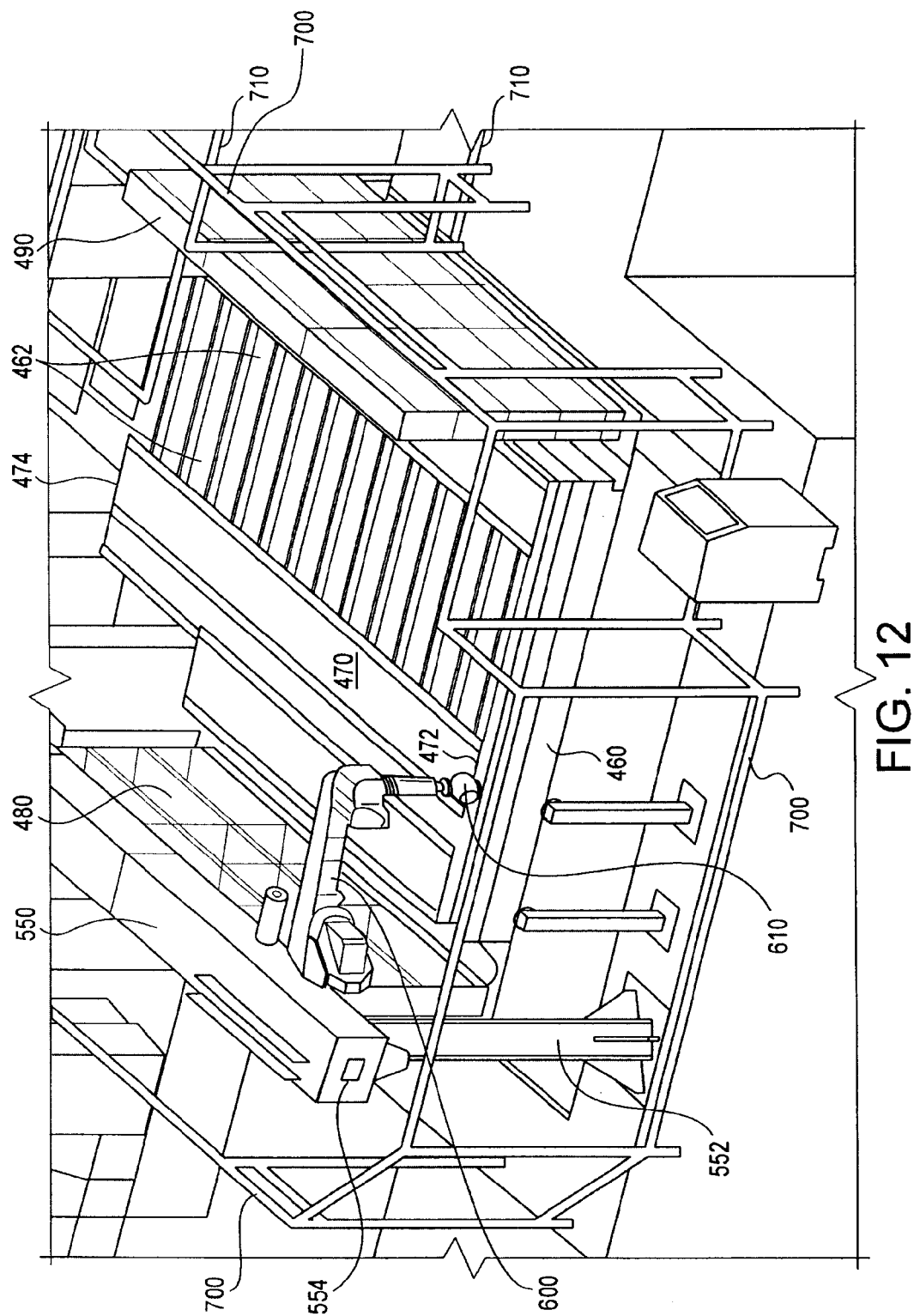
FIG. 12 is a detailed partial sectional view of the preferred embodiment press and hidden mold transfer assembly shown in FIGS. 9 to 11, in which the mold transfer assembly is in an extended position.

The assembly 450 is shown in a retracted position in FIGS. 9 and 11, and in an extended position in FIGS. 10 and 12. The press 310 generally comprises two platens that serve to apply pressure to a set of molds, as previously described herein. A first stationary platen 320 and a second movable platen 330 are horizontally aligned with each other and maintained in such alignment by a plurality of tie bars or guide members 340. Specifically, the guide members may include a pair of upper guide members 340a and 340b, and a corresponding pair of lower guide members 340c and 340d (not shown). The press 310 may also comprise an enclosure 380 generally surrounding the various mechanisms and assemblies of the press. One or more mold access doors 350 are preferably provided along one or more region(s) of the enclosure 380 for providing access to the set of molds generally positioned between the platens 320 and 330. A corresponding second set of access doors 352 can be provided on an opposite region of the press 310, opposite from the doors 350. One or both of the sets of access doors 350 and 352 are preferably configured such that they are slidably retracted alongside or within the enclosure 380. One or more control panels 370 (as shown in FIG. 10) are typically disposed near the press, or in certain applications, on or adjacent to the enclosure 380, and preferably, adjacent the access doors 350. It will be appreciated that the press 310, with which the preferred embodiment hidden mold transfer assembly 450 is used, can be in a variety of different configurations. In no way is the present invention limited to the preferred embodiment hidden mold transfer assembly 450 being used with only press(es) of the type and configuration shown in the referenced figures.

Referring further to FIGS. 9-12, the preferred embodiment hidden mold transfer assembly 450 is depicted as located alongside the press 310, and immediately adjacent to the mold access doors 350. The preferred embodiment hidden mold transfer assembly 450 preferably also includes a pair of doors 480 and 490 which open prior to or upon extension or raising of the mold transfer assembly 450. Preferably, one of the doors 480 or 490 is raised to a vertical position, and then upon confirmation that the door has been fully raised, the other door is then raised to a vertical position. Upon fully opening, the doors 480 and 490 are preferably in an upright, vertical position alongside opposite regions of the assembly 450 as shown in FIGS. 10 and 12. The preferred embodiment hidden mold transfer assembly 450 comprises a mold receiving member 460 and an extension assembly, such as a scissor-type lifting assembly (not shown), disposed under and in engagement with the member 460. The generally horizontal mold receiving member 460 includes a collection of rollers 462 which serve to support and enable horizontal movement of a mold or other component placed thereon.

FIGS. 10 and 12 reveal a preferred configuration for the preferred embodiment mold transfer assembly 450. Preferably, the mold transfer assembly 450 is positioned alongside the press 310 so that upon extension or raising of the assembly 450, and specifically, extension of the mold receiving member 460; a guide track 470 defined along the upper surface of the member 460 is at a height such that the member 460 can readily receive the molds or mold set (not shown) from the press 310. The guide track 470 is preferably provided to assist in the alignment and maintenance of alignment of one or mold(s) once placed upon the mold receiving member 460. The guide track generally extends from a distal region 472 along the upper surface of the mold receiving member 460, to a region 474 proximate the press 310. The guide track 470 is oriented generally horizontal and transverse to the direction of travel of the movable platen 330. The guide track 470 is of a width suitable to accept and engage an alignment member provided on a mold. Upon engagement between such member of the mold and the track 470, as the mold is displaced from the interior of the press 310 onto the mold receiving member 460, the mold is kept in an aligned relationship relative to the press 310 and specifically, the platens 320 and 330. The molds or mold set is typically horizontally transferred between a position on the mold receiving member 460 and a position within the interior of the press between the platens 320 and 330. One or more powered rollers exposed along the upper surface of the mold receiving member 460 and/or within the guide track 470, serve to horizontally move the mold, placed thereon. These powered rollers assist in transferring a mold to or from the press.

As previously noted, extension of the mold receiving member 460 to a preferred height relative to the press, generally dictates that the lifting assembly of the mold transfer assembly 450 be disposed underneath the mold receiving member 460. Accordingly, it is generally preferred that the base of the mold transfer assembly 450 be positioned at a lower elevation than the base of the press 310. As previously described with regard to the press 10 and mold transfer assembly 150, in the event that the press 310 is mounted in a recessed region relative to the floor 2, such as recessed region 4 depicted in FIG. 10, then for the previously noted reasons, it is preferred that the preferred embodiment mold transfer assembly 450 be mounted in a further recessed region, i.e. relative to the region 4.

Preferably, the mold transfer assembly 450 provides vertical positioning of the mold receiving member 460. The range of vertical displacement of member 460 may be from only several inches to several feet or more, however the range is preferably from about 6 inches to about 48 inches, and more preferably from about 12 inches to about 36 inches. It is also contemplated that depending upon the particular configuration and relative location of the mold transfer assembly to the press, that the mold receiving member 460 may be configured so as to be horizontally positionable. For example, the member 460 can be horizontally positionable at least partially within the enclosure 380 of the press 310, or otherwise positioned alongside the press 310.

FIGS. 10 and 11 also illustrate another preferred feature of the enclosure 700. Preferably, a movable frame 710 can be provided that is slidably engaged to the enclosure 700. A track and roller assembly or other means can be used to assist in moving the frame 710. The frame 710 is preferably disposed along a side or region of the enclosure 700 proximate the injection molding press 310 and particularly, the mold access doors 350. The frame 710 can be in a closed position such as shown in FIG. 11 when the mold transfer assembly is in a stowed position and the doors 480 and 490 are closed. In this closed position, the frame 710 extends at least partially over the doors 480 and 490. The frame 710 may also be opened as shown in FIG. 10 wherein the frame 710 is moved to a position such that the doors 480 and 490 maybe opened, and the mold transfer assembly may be extended upward. The enclosure 700 can also include a screen or wire mesh along one or more open regions of the enclosure 700. It is also contemplated to use partitions along the enclosure to further segregate the servicing or drop cell region A from the area(s) outside of the enclosure.

In yet another aspect, the present invention provides a preferred embodiment assembly that enables a wide array of different size molds, and particularly, molds having different heights, to be accommodated by an injection molding press. Preferably, in accordance with the present invention, a roller plate assembly is provided along each opposing face of the platens of the press. That is, a first roller plate assembly is adjustably mounted on a face of the stationary platen, and a second roller plate assembly is adjustably mounted on an opposing face of the movable platen. Each of the roller plate assemblies serve to support the molds and can be selectively moved up or down so as to accommodate a wide range of molds or mold sets having different heights. Preferably, each roller plate assembly includes an upwardly directed roller cover face, upon which a portion of the mold is supported. Exposed through apertures defined along the roller cover face, is a plurality of powered rollers. The powered rollers assist in bringing a mold to the interior of the press, or returning a mold from the press. The entire roller plate assembly is vertically adjustable with respect to the platen to which it is mounted. Each roller plate is preferably vertically positionable by the use of one or more hydraulic actuators disposed under the roller plate. Each roller plate assembly also preferably includes one or more travel clampers which serve to engage a mold when such mold is positioned on the roller cover face, with the respective platen. Additional travel clampers are also provided along an upper region of each face of the platens.

Figure 13:
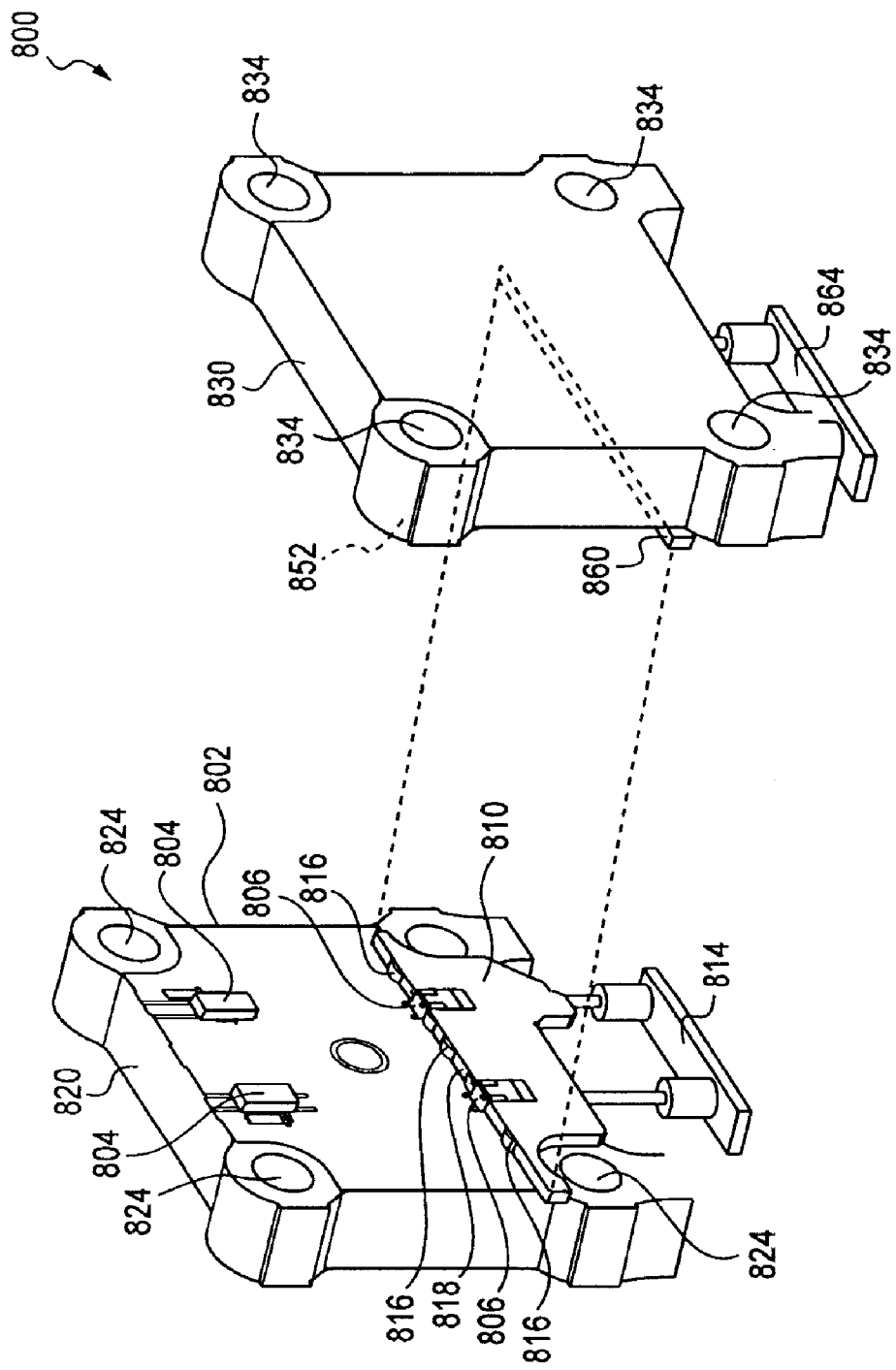
FIG. 13 is a perspective schematic view of molding press platens, each including a preferred embodiment roller plate assembly in accordance with the present invention.

FIG. 13 is a perspective schematic view of the platens of an injection molding press, such as that shown in FIGS. 9-12. Each platen includes a preferred embodiment roller plate assembly in accordance with the present invention. That is, the stationary platen comprises a first roller plate assembly, and the movable platen comprises a second roller plate assembly. A set of hydraulic actuators are positioned under each roller plate assembly and serve to support the roller plate assembly, and as described in greater detail herein, also provide vertical adjustment of each roller plate assembly relative to the face of the respective platen to which the roller plate assembly is mounted. Specifically, FIG. 13 illustrates a pair of press platens 800 comprising a stationary platen 820 and a movable platen 830. Each of the platens 820, 830 includes a roller plate assembly as described herein. The platen 820 includes a first roller plate assembly 810 selectively positionable along a pressing face 802 of the platen 820. The platen 820 defines a collection of guide apertures 824. Similarly, the platen 830 includes a second roller plate assembly 860 selectively positionable along a pressing face 852 of the platen 830, and a collection of guide apertures 834. Each of the roller plate assemblies 810, 860 includes an upwardly directed ledge or roller cover plate having a plurality of apertures, through which are exposed a corresponding number of powered rollers. For the roller plate assembly 810, the roller cover plate 818 defines apertures through which portions of powered rollers 816 are accessible. Preferably, each of the powered rollers 816 are rotatable about an axis generally perpendicular to the face 802 of the platen 820. This promotes parallel orientation and maintenance of such as a mold is displaced to or from the interior of the press due to powered rotation of the rollers 816. One or more hydraulic actuators are positioned under each roller plate assembly. Upon repositioning a roller plate assembly along the face of a platen, the actuator is brought into contact with the underside of the roller plate assembly. For example, a hydraulic actuator 814 is disposed under the roller plate assembly 810, and a hydraulic actuator 864 is provided under the roller plate assembly 860. The preferred press platens 800 also comprise one or more travel clampers disposed along a pressing face of each platen. For example, the stationary platen 820 preferably comprises a pair of upper travel clampers 804 disposed along the upper region of the face 802 of the platen 820. And, the stationary platen 820 also preferably comprises a pair of lower travel clampers 806 disposed along the roller plate cover 818. The movable platen 830 preferably comprises a corresponding set of four travel clampers disposed along face 852. It will be understood, that preferably the roller plate assemblies 810 and 860 are at the same height. And, if any vertical adjustment is made to one, a corresponding adjustment is made to the other.

Figure 15:
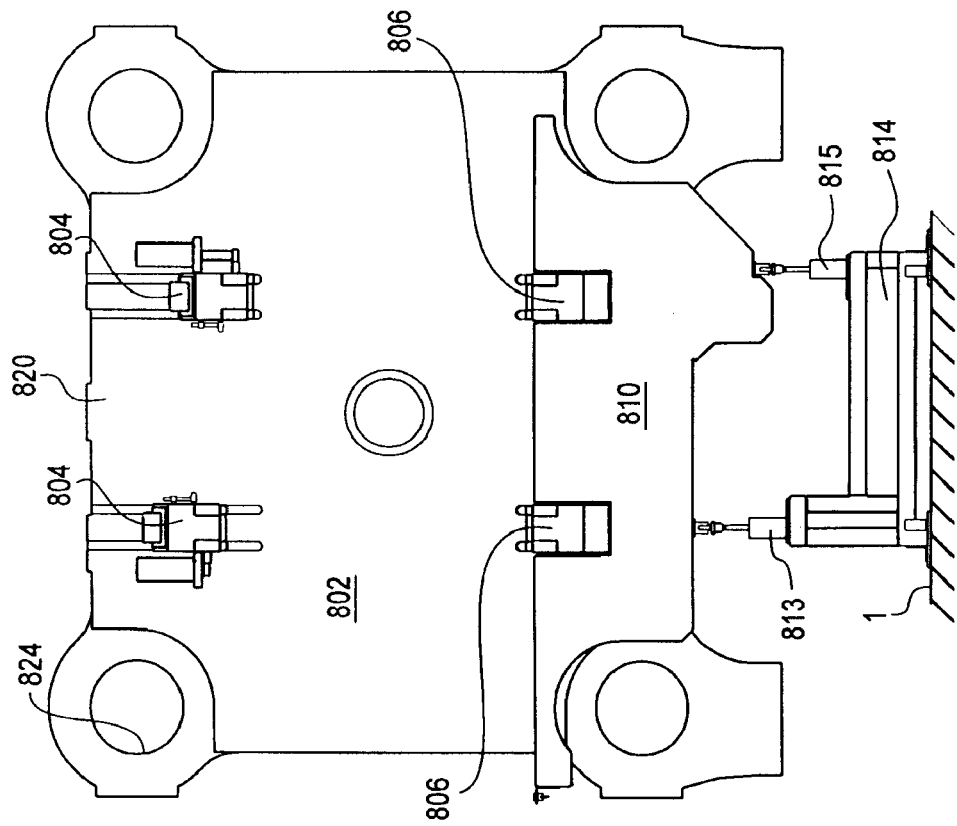
FIG. 15 is a front view of the stationary platen and roller plate assembly shown in FIG. 14.
Figure 14:
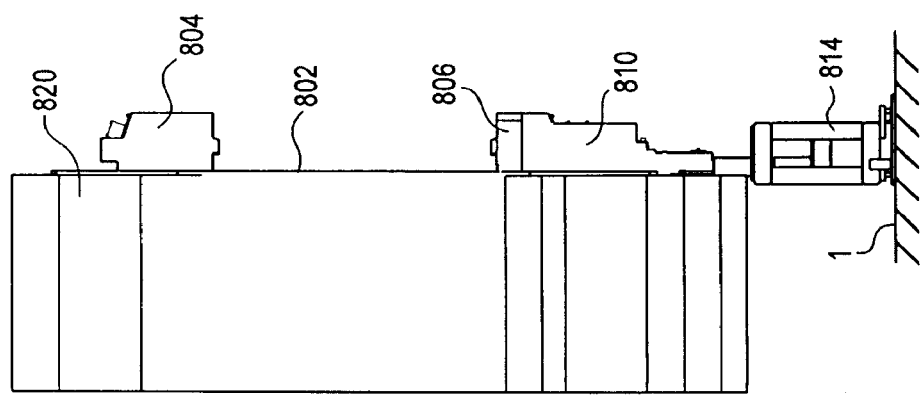
FIG. 14 is a side view of a stationary platen and a preferred embodiment roller plate assembly.

FIGS. 14 and 15 depict a platen and a preferred embodiment roller plate assembly. FIG. 14 is a side view of the stationary platen 820 and the roller plate assembly 810. And, FIG. 15 is a front view of the stationary platen 820 and the roller plate assembly 810 of FIG. 14. A corresponding lower pair of travel clampers 806 is included with the roller plate assembly 810. And, a corresponding upper pair of travel clampers 804 is included along an upper region of the same face 802 of the platen 820. The travel clampers 804, 806 can be selectively vertically positioned, and serve to affix the mold, once in a desired position and supported on the roller plate cover, along the face of the platen 820. In certain embodiments, it is preferred that the travel clampers include an engagement member that is vertically positionable and which contacts the mold. Upon loosening or partial disengagement of the roller plate assembly 810 from the face 802 of the platen 820, the hydraulic actuator 814 is used to support the weight of the assembly 810 and also to selectively move that assembly 810 to a desired height along the face 802. The actuator 814 may include one or more hydraulic cylinders 813, 815 as known in the art. The hydraulic actuator 814 is preferably disposed on a floor region 1 under the press. The travel clampers 804 and 806 can be vertically positioned upon engagement with a mold, to engage the mold to the platen 820.

Figure 16:
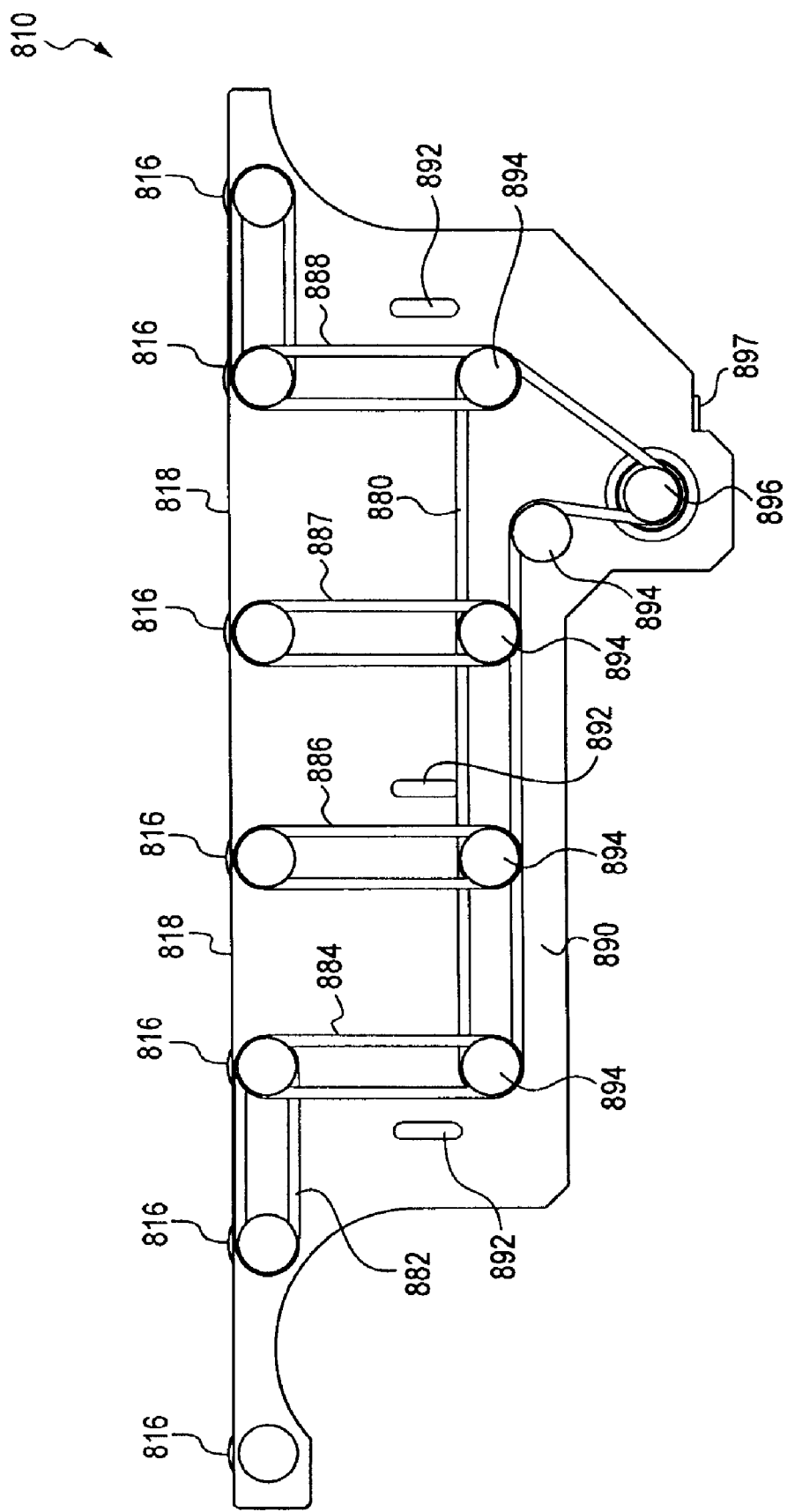
FIG. 16 is a detailed view of a preferred embodiment roller plate assembly, revealing various aspects of the assembly

FIG. 16 is a detailed view of a preferred embodiment roller plate assembly, revealing various aspects of the assembly. Specifically, FIG. 16 illustrates the roller plate assembly 810 having an outer cover removed to thereby reveal the interior of the assembly. The roller plate assembly 810 includes a body 890 or other support member. Preferably, the roller plate assembly 810 comprises a plurality of rollers 816 that are exposed and partially project above the upwardly directed surface of the roller cover plate 818. The rollers are rotatably mounted to the body 890. Each of the rollers is powered, i.e. rotated, by one or more drive belts such as belts 882, 884, 886, 887, and 888. Those drive belts in turn, are powered by a primary drive belt 880 that runs along idler rollers 894. The idler rollers 894 are also preferably rotatably mounted to the body 890. The roller plate assembly 810 further comprises a motor 896 that powers the drive belts and rollers. The assembly 810 may additionally comprise one or more support plates 897 for contacting a hydraulic actuator. The body 890 preferably defines one or more slotted apertures 892 through which mounting bolts can be inserted and engaged with a receiving face or member of a platen. As will be appreciated, the use of slotted apertures enables the mounting bolts (not shown) to simply be loosened, thereby enabling the roller plate assembly 810 to be vertically positioned with respect to the bolts and mounting member or platen.

In another preferred aspect, the present invention provides particular methods for adjusting or changing the relative position(s) of the roller plate assemblies, bringing a mold into a press, and removing a mold from a press. Each of these three operations is described below. It will be appreciated that in no way is the present invention limited to these particular operations and sequences of steps. The descriptions provided herein, are merely preferred sequences. Variations in these methods may occur, depending upon particular plant parameters, manufacturing objectives, and other criteria.

A first preferred operation is a method of adjusting the position of the platen rollers, also referred to herein as the roller plate assembly. A preferred embodiment sequence is set forth below in Table 1. In this sequence, although only reference to adjusting the roller plate assembly along a face of the movable platen is provided, it will be appreciated that the same process applies to the roller plate assembly on the stationary platen. Both process are preferably performed concurrently with one another. In a first step, designated as step I, one or more control switches are actuated to place the injection molding machine (or more conveniently referred to herein as "press") to a mold change position mode. An operator inputs information into the press control system that identifies the mold or mold type that is to be received in the press. Typically, inputting such information into the control system will include information such as the mold height and mold base width. Next, in step II (as designated in Table 1), the moving platen (such as platen 830 in FIG. 13) is set to a roller adjust position. Next, in step III, the hydraulic actuators (such as hydraulic actuator 864 in FIG. 13) are raised to a position such that they support the roller plate assembly (such as 860 in FIG. 13). In step IV, a machine gate or other operator entrance is opened. This may involve opening the mold access doors 350 shown in FIG. 11 and/or the enclosure gate 710 of FIG. 11. Step V involves placing the press into a safe stop position so that an operator can enter the press. This may involve initiating an emergency stop or other lockout procedures, designated herein as a "lock out, tag out" (LOTO) procedure. In step VI, various bolts and keys are loosened or otherwise removed to allow the roller plate assembly (e.g. 860 in FIG. 13) to be selectively positioned along the face of the platen (e.g. face 852 of the platen 830 in FIG. 13). In step VII, the operator exits the press and reverses the LOTO procedure and returns power to select portions of the press. In step VIII, the machine gate is closed. Again, this may involve closing the mold access doors 350 and/or the gate 710 in FIG. 11). In step IX, the hydraulic actuators (e.g. 864 in FIG. 13) are powered to move or otherwise position the roller plate assembly (e.g. 860 in FIG. 13) as desired, along the face of the platen. One or more limit switches or proximity switches along the face of the platen can be used to provide confirmation of particular positions being achieved. In step X, the machine gate (such as doors 350 and/or gate 710) is opened again, to allow an operator to enter the press. Step XI is similar to previously described step V, and places the press in a safe mode. In step XII, the roller plate assembly (860 in FIG. 13), now in its new desired position, is secured to the platen (830 in FIG. 13). Generally, various bolts are tightened to firmly engage the roller plate assembly to the platen. As will be appreciated, particular tightening procedures should likely be followed to ensure proper tightening and to avoid placing uneven stresses upon the roller plate assembly. In step XII, the operator or other supervisory personnel confirms that the roller plate assembly has been properly tightened and engaged to the platen. In step XIV, the operator (or supervisory personnel) exits the press and the LOTO procedure is reversed, along with any safety stops or shut downs being removed. In step XV, the machine gate (e.g. doors 350 and/or gate 710) is closed. In step XVI, the hydraulic actuators (e.g. 864 in FIG. 13) are lowered, and returned to their stowed position such that they do not interfere with the mold or moving platen. In step XVII, the front machine gate (such as doors 350 and/or gate 710) may then be opened, and the machine given permission to run as shown in step XVIII.

TABLE 1

Platen Roller Position Procedure

| | Operation | Notes |
| --- | --- | --- |
| I | Turn operator control switch to mold change position. | Injection barrel is retracted, mold identification set in program and loaded (minimum information: shut height, mold base width) No mold is in the press. |
| II | Set moving platen to roller adjust position. This is a manual clamp adjustment. Machine will be in mold set and a selector switch will be set to the "Roller Adjust Position". Clamp automatically stops at position. | Injection molding machine will have preset position for roller adjust. |
| III | Raise hydraulic adjuster(s) into position to support roller assembly. | Adjuster will have precision tolerance position limit |
| IV | Open front machine gate | Pumps and output disable when limit or proximity switches not confirmed. |

TABLE 1-continued

Platen Roller Position Procedure

| | Operation | Notes |
|---|---|---|
| V | Remove master key from injection molding machine and apply LOTO procedure to access injection molding machine inside area for roller adjustment. Machine is in E-Stop condition. | |
| VI | Remove locking bolts and locating keys, Loosen safety bolts to allow unit to slide. | Depending on final roller configuration safety bolts may remain tight against spools. |
| VII | Exit injection molding machine, reverse LOTO procedure and place injection molding machine master key into master switch. | |
| VIII | Close front machine gate | |
| IX | Raise or lower rollers to desired position for mold application. | |
| X | Open front machine gate | Pumps and output disable when limit or proximity switches not confirmed. |
| XI | Remove master key from injection molding machine and apply LOTO procedure to access injection molding machine inside area for roller adjustment. Machine is in E-Stop condition. | |
| XII | Insert locating keys and retainer bolts in roller assemblies moving and stationary, Tighten safety bolts and retainer bolts using torque diagram with pre-set torque wrench. | Program position matches setting for stationary and moving platens. |
| XIII | Confirm retainer bolt torque process and completion. Confirm torque log and authorize mold set. | |
| XIV | Exit injection molding machine, reverse LOTO procedure and place injection molding machine master key into master switch. | |
| XV | Close front machine gate | |
| XVI | Lower hydraulic adjuster(s) to stowed position | |
| XVII | Open front machine gate | Pumps and output disable when limit or proximity switches not confirmed. |
| XVIII | Machine given permission to run. | |

In another aspect, a preferred embodiment mold "carry in" procedure is provided as follows. This procedure is set forth in Table 2 below. If the press and/or control system is equipped with an operator console, that console is preferably brought into a desired position, as noted in step I. At this step, it is also preferred that any robots or equipment in the drop cell area outside of the press (such as region A shown in FIG. 9) be brought to a known and/or safe position which allows sufficient clearance for an incoming mold. Also, at this juncture, it is preferred that the roller plate assemblies (such as assemblies 810 and 860 in FIG. 13) are in a proper position such that they can receive the desired mold. Interlocks requiring positioning of any overhead robots or other equipment, and confirmation of positioning of the roller plate assemblies can be used to ensure such prior to proceeding. In step II, the press is placed into a mold change position. Step III may involve confirming that any equipment within the mold receiving area, is moved. In step IV, a gate to the drop cell (e.g. gate 710 in FIG. 11) is opened. In step V, the mold transfer assembly doors (e.g. doors 480 and 490 in FIG. 9) are opened. Step VI involves selecting a bridge raise position and moving the travel campers (e.g. travel clampers 804 and 806 in FIG. 13) to a position such that they can receive the mold. In step VII, a draw bridge or walkway is raised, within or alongside the press, to a mold change position. In step VIII, the press control system is place in a mold in/out mode. This can include further moving the travel clamps. In step IX, the press gate (e.g. doors 350 in FIG. 11) is opened to allow operator access. In step X, a gate rail typically disposed within a press, is raised. In step XI, the mold transfer receiving member (such as member 460 in FIGS. 10 and 12) is raised from its stowed position beneath the floor. The mold receiving member is raised to a height that is determined from information previously entered into the press control system as to the type, size, and/or configuration of the mold to be brought into the press. Next, in step XII, the press is placed in a stop position, and where applicable, a LOTO procedure undertaken. At this juncture, the desired mold is placed onto the mold receiving member of the mold transfer assembly. Typically, this may be performed by one or more overhead cranes. After proper positioning of the mold on the mold receiving member, any crane cables are then removed. In step XIV, the operator exits the drop cell region and reverses the stop mode and/or the LOTO procedure. The mold carry in sequence is then initiated, as designated in step XV. Upon initiation, the powered rollers of each roller plate assembly (e.g. rollers 816 of roller plate assembly 810 shown in FIG. 13) rotate and pull the mold from its position on the mold receiving member into the interior of the press. In step XVI, the carry in process is completed upon confirmation, such as by one or more limit or proximity switches within the interior of the press. In step XVII, the mold receiving member (e.g. member 460 in FIGS. 10 and 12) is retracted or otherwise returned to its position below floor level. In step XVIII, the gate rail is lowered, and in step XIX, the gate or access doors to the press is closed, thereby preventing any further access into the interior of the press. In step XX, press clamping tonnage is increased and mold travel clampers (e.g. clampers 804 and 806 in FIG. 13) are locked to engage the mold to the platens. In step XXI, the mold transfer assembly doors (e.g. doors 480, 490 in FIG. 9) are closed. In step XXII, a clamp for a bridge is opened, thereby allowing step XXIII, in which the bridge is lowered. In step XXIV, any gates to the drop cell area (such as gate 710) are closed. In step XXV, a LOTO procedure is initiated. Step XXVI involves connection of the various utilities to the mold. Typically, an operator will enter the interior of the press and connect water lines, electrical power and control cables, and hydraulic lines to the mold. After completion of this, the operator exits the press and step XXVII is performed in which a LOTO procedure is reversed. In step XXVIII, the press control system is placed to a mold production mode. Step XXIX involves positioning or placement of the operator console, if necessary.

TABLE 2

Mold Carry In Procedure

| | Operation | Notes |
|---|---|---|
| I | Move operator console to mold change position | Robot must be in safe position and platen rollers must be confirmed in proper position for mold height. Clamps are unlocked. |
| II | Turn operator control switch to mold change position. | Injection barrel is retracted, mold identification set in |

TABLE 2-continued

Mold Carry In Procedure

| | Operation | Notes |
|---|---|---|
| | | program and loaded (minimum Information: shut height, mold base width) |
| III | Confirm conveyor is out of drop cell area. | If equipment is detected in the drop cell region, mold transfer assembly power is null. |
| IV | Slide open the drop cell gate until latched in open position. | |
| V | Open access doors | |
| VI | Select bridge raise position and move clamp to preposition (Bridge). | |
| VII | Raise draw bridge unit to mold change position. | |
| VIII | Select mold in/out preposition function. Move clamp to mold in/out function. | Pre-position will be determined by mold identification in the software after initial setup. |
| IX | Open front machine gate | |
| X | Raise gate rail and verify it is raised with a switch. | |
| XI | Raise mold receiving member to correct height as defined in injection molding machine set-up screen. Defined by mold identification entered into set up screen. | Mold receiving member raise and lock sequence completes and all signals are correct. |
| XII | Remove master key from injection molding machine and apply LOTO procedure to access drop cell for mold set. | |
| XIII | Set mold on mold receiving member and disconnect crane cables | Mold will be placed on the mold receiving member at this time. |
| XIV | Exit drop cell, reverse LOTO procedure and place injection molding machine master key into master switch. | |
| XV | Start mold carry in sequence. | |
| XVI | Mold carry in complete following confirmation from injection molding machine that mold clamp sequence is complete. | Clamps are not locked. |
| XVII | Lower mold receiving member to stowed position | |
| XVIII | Lower gate rail to molding position | |
| XIX | Close front machine safety gate | |
| XX | Build Tonnage and Mold locks locked. | |
| XXI | Close mold receiving member access doors | |
| XXII | Open clamp to bridge raise position | Mold is assumed to be in a safe condition to open at this time. |
| XXIII | Lower Bridge | |
| XXIV | Close drop cell safety gate as required for mold trial purpose. | |
| XXV | LOTO procedure to be implemented | |
| XXVI | Enter machine after all platforms and rails are in place. | If necessary, an override button can be provided to bypass the cores after the utilities are connected, tonnage is built, and the mold clamps are locked. |
| XXVII | Reverse LOTO | |
| XXVIII | Turn operator control switch to mold production position. | |
| XXIX | Move operator console to production position until desired position is reached. | Can run production with feedbacks confirmed |

A preferred embodiment mold "carry out" procedure is set forth below in Table 3. Generally, this is the same sequence as described for the mold carry in procedure, but performed in reverse.

TABLE 3

Mold Carry Out Procedure

| | Operation | Notes |
|---|---|---|
| I | Move operator console to mold change position by swinging the panel until latched in position | Robot must be in safe position and platen rollers must be confirmed in proper position for mold height. |
| II | Turn operator control switch to mold change position. | Injection barrel is retracted, Mold identification set in program loaded (minimum information: shut height, mold base width) |
| III | Enter machine through the drop cell. | If necessary, a Core override buttoncan be provided to bypass the cores after the utilities are connected, tonnage is built, and the mold clamps are locked. |
| IV | Confirm conveyor is out of drop cell area. | |
| V | Slide open the drop cell gate until latched in open position. | |
| VI | Open mold cart access doors | Mold will be placed on the mold receiving member at this time. |
| VII | Select bridge raise position and move clamp to preposition (Bridge). | Feedback for bridge raise/lower can be utilized. |
| VIII | Raise draw bridge unit to mold change position. | |
| IX | Build Tonnage and Mold locks unlocked. | |
| X | Select mold in/out preposition function. Move clamp to mold in/out function. | Feedback may be used for the pre-position position |
| XI | Open front machine gate | |
| XII | Raise gate rail and verify it is raised with a switch. | |
| XIII | Raise mold receiving member to correct height as defined in injection molding machine set-up screen. Defined by mold identification entered into set up screen. | Mold receiving member raise and lock sequence completes and all signals are correct. |
| XIV | Remove master key from injection molding machine and apply LOTO procedure to access drop cell for mold removal. | |
| XV | Start mold carry out sequence. | |
| XVI | Mold carry out complete following confirmation of signal 19 | |
| XVII | Connect crane cables and remove mold from mold receiving member | |
| XVIII | Exit drop cell, reverse LOTO procedure and place injection molding machine master key into master switch. | |
| XIX | Lower mold receiving member to stowed position | |
| XX | Lower gate rail to molding position | |
| XXI | Close front machine safety gate | |
| XXII | Close mold receiving member access doors | |
| XXIII | Close drop cell safety gate as required. | |
| XIV | Open clamp to bridge raise position | |
| XXV | Lower Bridge | |

The present invention mold transfer assembly may be used with a wide array of mold sizes and weights. However, the range of weights of molds to which the present invention is directed, is from about 5 tons to about 50 tons, typically from about 10 tons to about 30 tons, and particularly from about 15 tons to about 25 tons. However, it is to be understood that the present invention can be used with molds having weights less than or greater than these indicated weights.

The preferred embodiment hidden mold transfer assembly can be used with a variety of different types, styles, and configurations of presses. For example, the preferred assemblies can be used in conjunction with presses that do not use tie bars for establishing and maintaining clamping forces. And, presses employing more than one movable platen can be used in conjunction with the present invention. Details as to various presses and their operation are provided in U.S. Pat. Nos. 6,945,765; 6,613,262; and 5,620,723 for example.

The present invention finds significant utility in the manufacturing environment, and particularly in facilities with large injection molding presses. By use of the various hidden mold transfer assemblies, when it is desired to change or service a mold set, the transfer assembly can be extended from its stowed position below floor level, to an extended position at which it can receive and support the mold set from the press. After appropriate changing, servicing, or other operations involving the mold set, and return of the same or a different mold set to the press, the transfer assembly can be retracted back to its previous stowed position below the floor. One or more doors can then be closed to overlie the retracted transfer assembly, and thereby provide increased floor space around the injection molding press. This floor space can then be used for nearly any purpose.

Many other benefits will no doubt become apparent from future application and development of this technology.

All patents and publications referenced herein are incorporated herein by reference in their entirety.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A mold transfer assembly adapted for use with an injection molding press defining an access opening at least partially above a floor region proximate the access opening, the press including a mold set within an interior region of the press, the mold set being laterally accessible through the access opening during changing of the mold set, the mold transfer assembly comprising:
    a stationary support base disposed adjacent to the injection molding press; and
    a mold receiving member movably engaged with the stationary support base and selectively positionable between (i) an extended position at which the mold receiving member is proximate the access opening of the press, and (ii) a retracted position at which the mold receiving member is disposed below the floor region.

2. The mold transfer assembly of claim 1 further comprising:
    a lifting mechanism engaged to the mold receiving member and adapted to selectively position the mold receiving member between (i) and (ii).

3. The mold transfer assembly of claim 1 wherein the mold receiving member includes a plurality of rollers, and defines an upwardly directed mold receiving surface along which the plurality of rollers are accessible.

4. The mold transfer assembly of claim 1 wherein the mold transfer assembly is at least partially disposed in a recessed region below the floor region, the recessed region defined generally under the access opening of the press, the mold transfer assembly further comprising:
    at least one door pivotally secured along a generally horizontal axis, the door being adjacent to the recessed region and positionable between (i) a generally vertical orientation proximate the mold receiving member when the mold receiving member is in the extended position and (ii) a generally horizontal orientation and co-planar with the floor region and disposed at least partially over the recessed region and the mold receiving member when the mold receiving member is in the retracted position.

5. The mold transfer assembly of claim 4 wherein the at least one door includes two doors, each door pivotally secured along a generally horizontal axis along opposite sides of the recessed region.

6. The mold transfer assembly of claim 4 wherein the at least one door includes a railing affixed to a face of the door.

7. An injection molding press and mold transfer assembly comprising:
    an injection molding press including two platens and a replaceable mold set disposed between the platens, wherein the mold set is accessible along a lateral region of the press and above the floor; and
    a mold transfer assembly including a stationary support base disposed adjacent to the injection molding press and a mold receiving member movably engaged with the stationary support base and selectively positionable between (i) an extended position at which the mold receiving member is adjacent to the lateral region of the press, and (ii) a retracted position at which the mold receiving member is disposed below the floor.

8. The injection molding press and the mold transfer assembly of claim 7 further comprising:
    a lifting mechanism engaged to the mold receiving member and adapted to selectively position the mold receiving member between (i) and (ii).

9. The injection molding press and the mold transfer assembly of claim 7 wherein the mold receiving member includes a plurality of rollers, and defines a mold receiving surface along which the plurality of rollers are accessible.

10. The injection molding press and the mold transfer assembly of claim 7 further comprising:
    at least one door positionable between (i) a generally vertical orientation proximate the mold receiving member when the mold receiving member is in the extended position and (ii) a generally horizontal orientation and disposed over the mold receiving member when the mold receiving member is in the retracted position.

11. The injection molding press and the mold transfer assembly of claim 10 wherein the at least one door includes two doors.

12. The injection molding press and the mold transfer assembly of claim 10 wherein the at least one door includes a railing affixed to a face of the door.

13. The injection molding press and mold transfer assembly of claim 7 wherein at least one of the mold platens defines a pressing face and comprises:
    a roller plate assembly selectively vertically positionable and disposed along the pressing face of the platen, the roller plate assembly including (i) an upwardly directed roller plate cover defining at least one aperture, and (ii)

a powered roller partially extending through the aperture, the powered roller rotatable about an axis perpendicular to the pressing face of the platen.

14. A method for transporting a mold between an interior of an injection molding press and a location external to the injection molding press, the injection molding press defining an access opening at least partially above the floor at which the mold is accessible, the method comprising:

provisioning a mold transfer assembly alongside the injection molding press and within a recessed region at least partially below the floor and proximate the access opening, the mold transfer assembly including a mold receiving member selectively positionable between (i) an extended position at which the mold receiving member is proximate the access opening of the press, and (ii) a retracted position at which the mold receiving member is disposed below the floor;

upwardly extending the mold receiving member above the floor at which the mold receiving member is proximate the access opening of the press and at a location external to the press;

transferring the mold from the interior of the press to the mold receiving member; and retracting the mold receiving member below the floor within the recessed region.

15. The method of claim 14 wherein the mold transfer assembly further includes at least one door positionable between (i) a generally vertical orientation proximate the mold receiving member when the mold receiving member is in the extended position and (ii) a generally horizontal orientation and disposed over the mold receiving member when the mold receiving member is in the retracted position below the floor, the method further comprising:

prior to upwardly extending the mold receiving member, positioning the at least one door to the generally vertical position.

16. The method of claim 15 further comprising:

after retracting the mold receiving member below the floor within the recessed region, positioning the at least one door to the generally horizontal orientation and disposed over the mold receiving member.

17. The method of claim 14 wherein the injection molding press includes a mold platen defining a pressing face and comprising a roller plate assembly selectively vertically positionable and disposed along the pressing face of the platen, the roller plate assembly including (i) an upwardly directed roller plate cover defining at least one aperture, and (ii) a powered roller partially extending through the aperture, the powered roller rotatable about an axis perpendicular to the pressing face of the platen, and wherein the transferring step includes:

rotating the powered roller to thereby horizontally displace the mold from the interior of the press.

* * * * *